(12) United States Patent
Guertler et al.

(10) Patent No.: US 8,938,684 B2
(45) Date of Patent: Jan. 20, 2015

(54) MODIFICATION FREE CUTTING OF BUSINESS APPLICATION USER INTERFACES

(75) Inventors: Jochen Guertler, Karlsruhe (DE); Thomas Chadzelek, Quierschied (DE)

(73) Assignee: SAP SE, Walldorf (DE)

( * ) Notice: Subject to any disclaimer, the term of this patent is extended or adjusted under 35 U.S.C. 154(b) by 822 days.

(21) Appl. No.: 12/718,657

(22) Filed: Mar. 5, 2010

(65) Prior Publication Data

US 2011/0078594 A1    Mar. 31, 2011

Related U.S. Application Data

(63) Continuation-in-part of application No. 12/570,688, filed on Sep. 30, 2009, and a continuation-in-part of application No. 12/571,116, filed on Sep. 30, 2009.

(51) Int. Cl.
*G06F 3/00* (2006.01)
*G06F 3/0482* (2013.01)

(52) U.S. Cl.
CPC ................................... *G06F 3/0482* (2013.01)
USPC ............ 715/762; 715/763; 715/764; 715/744

(58) Field of Classification Search
USPC ......................................................... 715/762
See application file for complete search history.

(56) References Cited

U.S. PATENT DOCUMENTS

| | | | |
|---|---|---|---|
| 7,228,525 B2 | 6/2007 | Chadzelek | |
| 7,441,200 B2 * | 10/2008 | Savage | 715/762 |
| 7,461,382 B2 | 12/2008 | Hammerich et al. | |
| 7,546,602 B2 | 6/2009 | Hejlsberg et al. | |
| 7,577,672 B2 | 8/2009 | Guertler et al. | |
| 7,647,564 B2 * | 1/2010 | Olander et al. | 715/854 |
| 7,747,677 B2 * | 6/2010 | Jolley et al. | 709/203 |
| 7,761,591 B2 | 7/2010 | Graham | |
| 7,836,456 B1 | 11/2010 | Violleau et al. | |
| 2002/0129023 A1 | 9/2002 | Holloway et al. | |
| 2004/0260408 A1 | 12/2004 | Scott et al. | |
| 2006/0206890 A1 | 9/2006 | Shenfield et al. | |
| 2007/0203728 A1 | 8/2007 | Simon et al. | |
| 2007/0214110 A1 | 9/2007 | Guertler et al. | |
| 2007/0226104 A1 | 9/2007 | Burakoff et al. | |
| 2007/0240100 A1 | 10/2007 | Hammerich et al. | |
| 2008/0155493 A1 | 6/2008 | Zernik | |
| 2008/0215675 A1 | 9/2008 | Kaminitz et al. | |
| 2008/0222599 A1 | 9/2008 | Nathan et al. | |
| 2008/0229280 A1 | 9/2008 | Stienhans | |

(Continued)

OTHER PUBLICATIONS

U.S. Appl. No. 12/332,027, filed Dec. 10, 2008.

(Continued)

*Primary Examiner* — Omar Abdul-Ali
*Assistant Examiner* — Sherrod Keaton
(74) *Attorney, Agent, or Firm* — Fish & Richardson P.C.

(57) ABSTRACT

The present disclosure involves systems, software, and computer implemented methods for modification free UI cutting of components in an application. One process includes operations for identifying a selection of a particular portion of the user interface of the application for cutting. The position of the identified portion of the user interface of the application in a user interface control tree is determined and defined as a root node of the user interface control tree. The identification information of the root node is stored in personalization settings of the application, and user interface elements associated with the root node are rendered.

19 Claims, 26 Drawing Sheets

(56) References Cited

U.S. PATENT DOCUMENTS

| | | |
|---|---|---|
| 2008/0298342 A1 | 12/2008 | Appleton et al. |
| 2009/0100068 A1 | 4/2009 | Gauba et al. |
| 2009/0158166 A1 | 6/2009 | Dewar et al. |
| 2009/0249355 A1 | 10/2009 | Kaarela et al. |
| 2009/0328137 A1 | 12/2009 | Liang et al. |
| 2010/0017730 A1 | 1/2010 | Coppedge et al. |
| 2010/0037157 A1 | 2/2010 | Chang et al. |
| 2010/0153865 A1* | 6/2010 | Barnes et al. ............... 715/762 |
| 2010/0180254 A1 | 7/2010 | Petschnigg et al. |
| 2010/0235766 A1 | 9/2010 | Fujioka |
| 2010/0268702 A1 | 10/2010 | Wissner et al. |
| 2010/0268720 A1 | 10/2010 | Spivack et al. |
| 2010/0287512 A1* | 11/2010 | Gan et al. ................... 715/854 |
| 2011/0022955 A1 | 1/2011 | Gilfix |
| 2011/0044512 A1 | 2/2011 | Bambha et al. |
| 2011/0052012 A1 | 3/2011 | Bambha et al. |

OTHER PUBLICATIONS

U.S. Appl. No. 12/333,229, filed Dec. 11, 2008.

Office Action issued in U.S. Appl. No. 12/570,688 on Nov. 9, 2011; 8 pages.

Office Action issued in U.S. Appl. No. 12/570,688 on May 1, 2012; 11 pages.

Office Action issued in U.S. Appl. No. 12/571,116 on Sep. 28, 2011; 7 pages.

Office Action issued in U.S. Appl. No. 12/571,116 on Jan. 10, 2012; 9 pages.

Advisory Action issued in U.S. Appl. No. 12/571,116 on Mar. 19, 2012; 3 pages.

Office Action issued in U.S. Appl. No. 12/571,116 on May 23, 2012; 9 pages.

Office Action issued in U.S. Appl. No. 12/571,116 on Aug. 30, 2012; 9 pages.

Office Action issued in U.S. Appl. No. 12/571,116 on Feb. 5, 2014; 11 pages.

* cited by examiner

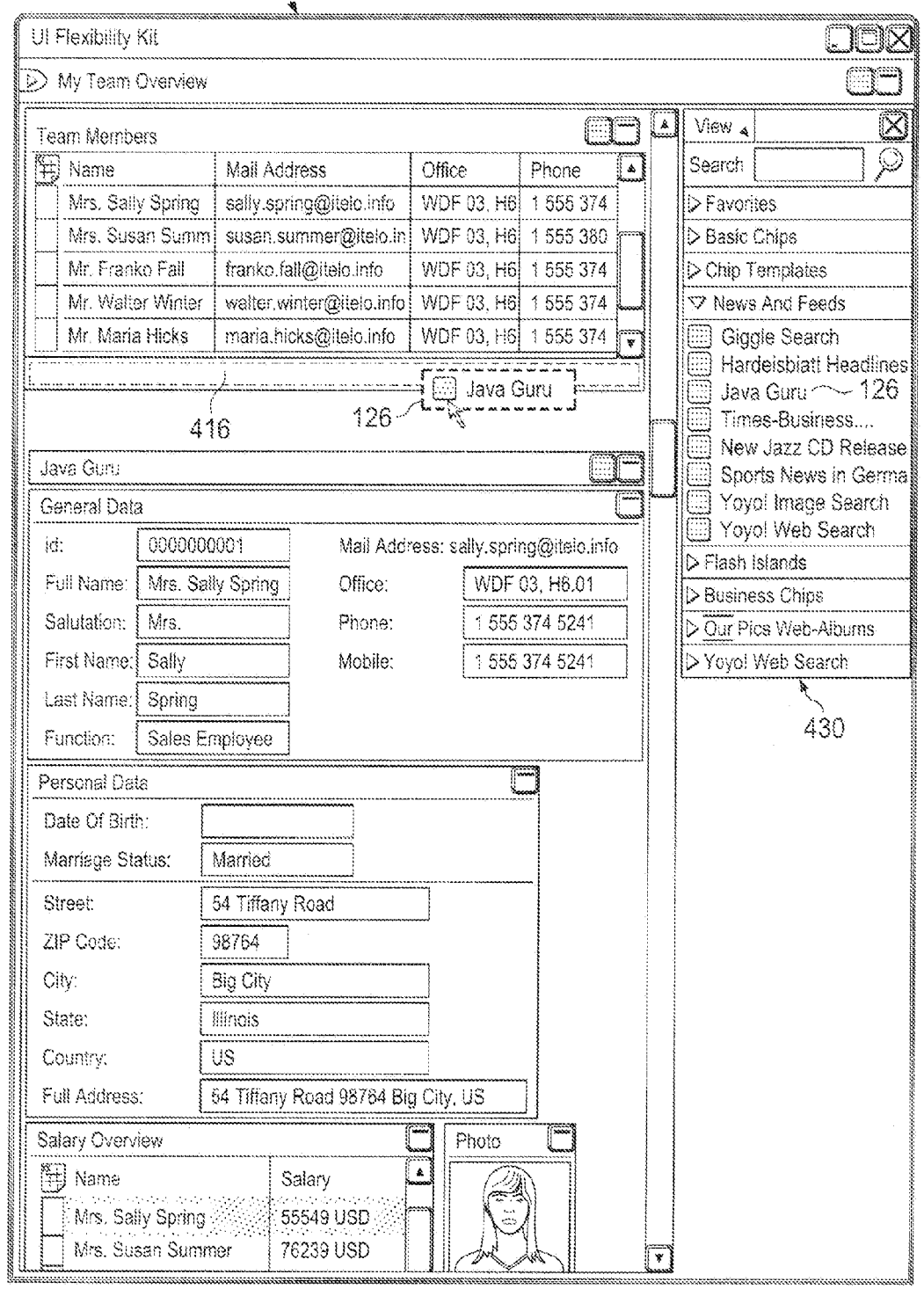

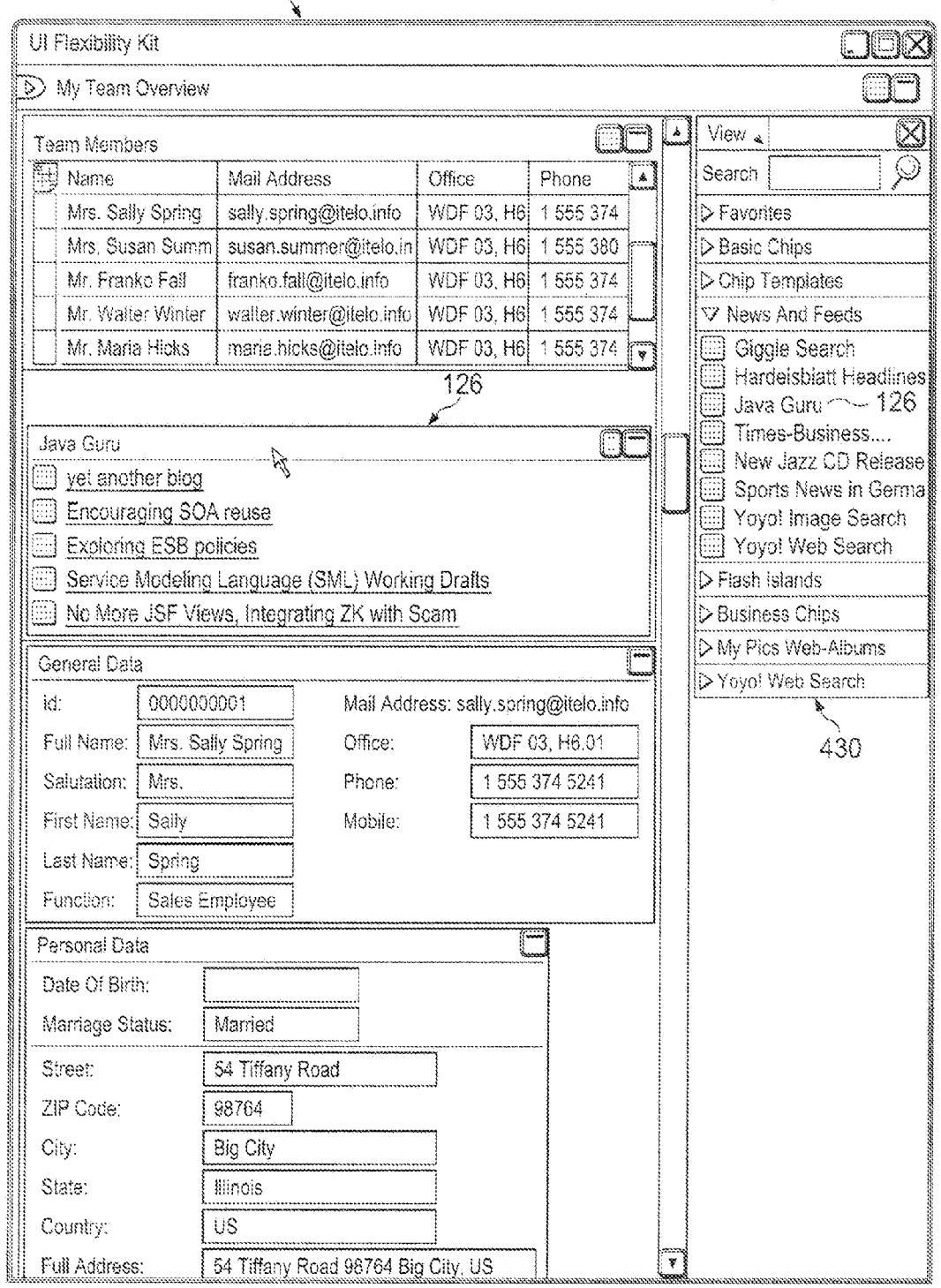

FIG. 8A

| Team Members | | | |
|---|---|---|---|
| Name | Mail Address | Office | Phone |
| Mrs. Sally Spring  810a | sally.spring@itelo.info | WDF 03, H6.01 | 1 555 374 5241 |
| Mrs. Susan Summer  810b | sus... | ...02 | 1 555 380 4524 |
| Mr. Franko Fall  810c | fran... | ...02 | 1 555 374 5241 |
| Mr. Walter Winter  810d | walt... | ...02 | 1 555 374 5241 |
| Mr. Maria Hicks  810e | mar... | | |

Popup menu:
- User Settings ▷
- Search Results for Team Membe... ▷
- Data Registering ▷
- UI Cutter ▷
- Data Tagging ▷ → Edit Tags
- Enrich Application UI ▷ → Reset Tags

General Data
- Id: 0000000001
- Full Name: Mrs. Sally Spring
- Salutation: Mrs.
- First Name: Sally
- Last Name: Spring
- Function: Sales Employee

- Mail Address: sally.spring@itelo.info
- Office: WDF 03, H6.01
- Phone: 1 555 374 5241
- Mobile: 1 555 374 5241

814a

Personal Data
- Date Of Birth:
- Marriage Status: Married
- Street: 54 Tiffany Road
- ZIP Code: 98764
- City: Big City
- State: Illinois
- Country: US
- Full Address: 54 Tiffany Road 98764 Big City, US

Salary Overview

| Name | Salary |
|---|---|
| Mrs. Sally Spring | 55549 USD |
| Mrs. Susan Summer | 76239 USD |
| Mr. Franko Fall | 65962 USD |
| Mr. Walter Winter | 68597 USD |
| Mr. Maria Hicks | 49676 USD |

MODIFICATION FREE CUTTING OF BUSINESS APPLICATION USER INTERFACES

CROSS-REFERENCE TO RELATED APPLICATIONS

This U.S. patent application is a continuation-in-part of, and therefore claims priority to, U.S. patent application Ser. No. 12/570,688 filed on Sep. 30, 2009 and U.S. patent application Ser. No. 12/571,116 filed on Sep. 30, 2009, which are incorporated herein by reference for all purposes.

TECHNICAL FIELD

The present disclosure relates to software, computer systems, and computer implemented methods for cutting of a business application user interface that is substantially modification free.

BACKGROUND

Certain applications can support mashup capabilities, permitting users to combine components of different applications onto one page or workspace. For example, a user may select a particular component of one application and insert the component into a second application. The combined components can be called mashup components because the components are capable of being "mashed up," or collected in a customized arrangement, on a page or workspace. The page typically has a layout used to define the visual order of "mashable" applications or components. Further, data flows can be defined between mashable applications by connecting the inputs or outports of these applications. In this way, a user of mashup applications can customize a page or workspace with only components that the user needs or desires.

In general, mashable applications are designed for use in mashup scenarios. Thus, mashable applications are typically and intentionally programmed to visually occupy only a portion of a user interface because otherwise, there would be no remaining visual space available in the application's user interface (UI) to include multiple mashup components. Many pre-existing applications, however, may not be specifically designed for use in mashup scenarios. Further, these applications may occupy the full screen of the user interface during runtime, making the applications generally unsuitable as a mashable application. A user may only need a particular portion of a full-screen application or may want to combine portions of the full-screen application with components of other applications such as other mashup components.

SUMMARY

The present disclosure provides techniques for modification free user interface (UI) cutting of components in a business application. A computer program product is encoded on a tangible storage medium, where the product comprises computer readable instructions for causing one or more processors to perform operations. These operations can include identifying a selection of a particular portion of the user interface of the application for cutting. The position of the identified portion of the user interface of the application in a user interface control tree is determined and defined as a root node of the user interface control tree. The identification information of the root node is stored in personalization settings of the application, and user interface elements associated with the root node are rendered.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 4A-C are example screenshots of an example UI injection process performed on a selected UI element of an application by an appropriate system, such as the system described in FIG. 1.

FIGS. 8A-D are example screenshots of an example tagging process performed on a selected UI element of an application by an appropriate system, such as the system described in FIG. 1;

FIGS. 11A-D are example screenshots of an example UI cutting and UI injection process performed on a selected component of an application by an appropriate system, such as the system described in FIG. 1; and FIGS. 12A-F are example screenshots of an example UI injection, UI cutting, and tagging process performed on a selected component of an application by an appropriate system, such as the system described in FIG. 1.

DETAILED DESCRIPTION

Figure 1:
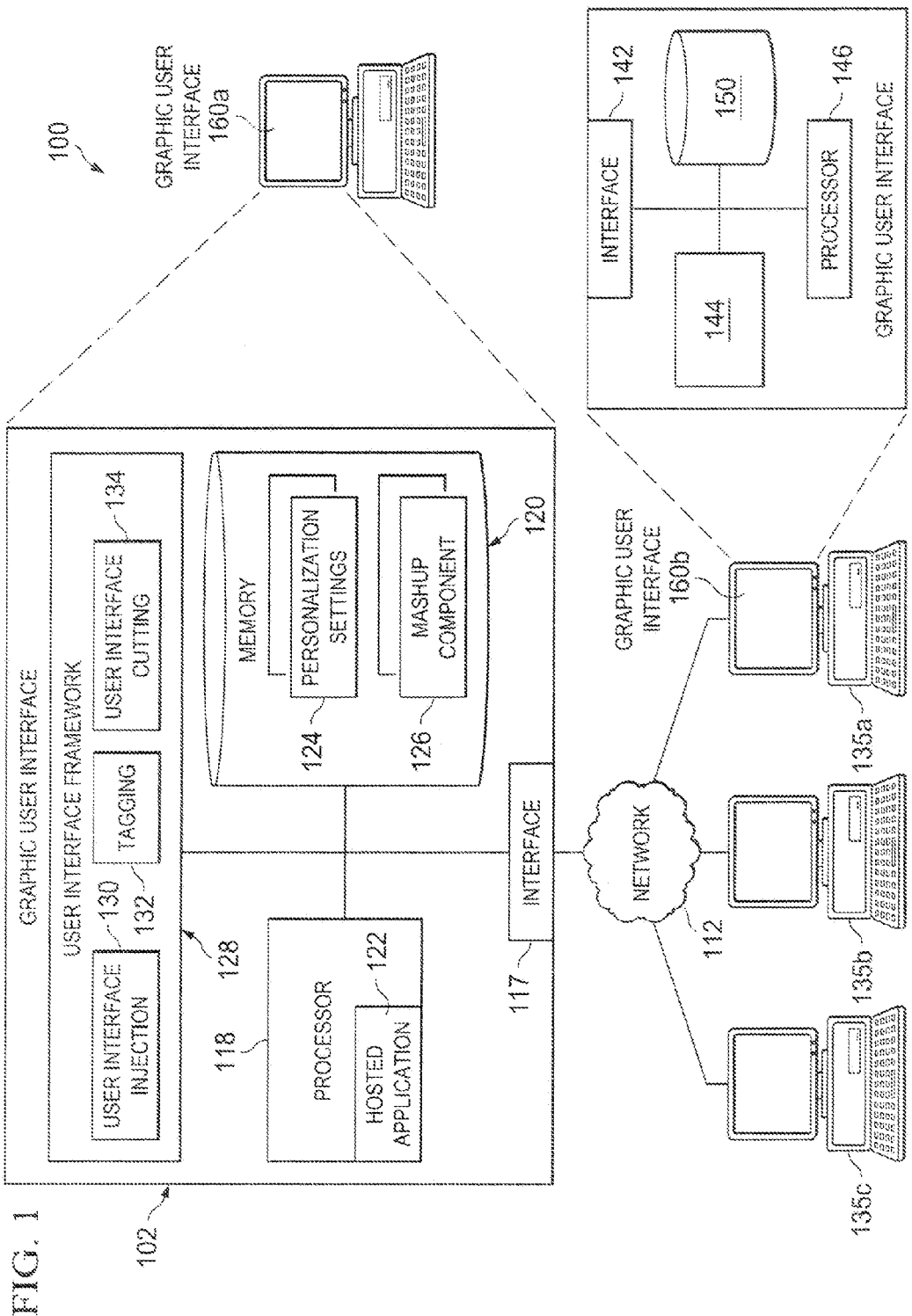
FIG. 1 illustrates an example environment implementing various features of modification free user interface (UI) injection into an application within the context of the present disclosure.

This disclosure generally describes computer systems, software, and computer implemented methods for cutting a portion or component of an application user interface (UI). In general, an application can be designed to support mashup functionality such as injection of mashup components into the application UI or cutting of particular components from the application UI for isolated use of the particular components. A mashup component can be a webpage, application, or part of an application such as a module, component, service, subroutine, or other element of an application that contains data or functionality that can be combined with another application or component, such as another mashup component. Thus, an application originally designed with mashup functionality can have particular data or functionality within the application combined with particular components of one or more external applications to create a new service. In some mashup scenarios, a page or workspace can have a layout used to define the visual arrangement of mashable applications. Further, mashable applications can be combined with other mashable applications through data flows connecting input and output ports of the applications as defined by the user.

Some pre-existing applications, however, may not be designed for use with mashup components, and the applications may be full-screen applications that do not allow the user to customize the arrangement of components within the application or to combine components from different applications. In other words, these pre-existing applications may have modules or components that occupy a predefined area of the application workspace, and access to these components may be limited to the format provided by the full-screen application. Accordingly, full-screen applications may have components that are generally not capable of being used simultaneously with other applications, such as other mashup components. Specifically, the components of full-screen applications may not have available input or output ports for data flow between components, and the visual representation and size of the components may not be suitable for mashup scenarios. For example, a user of a pre-existing full-screen application may want to remove portions of the application that are not needed or to only use relevant components within the application. Further, the user may want to use a relevant component of the full-screen application simultaneously with components of external applications while viewing the related components together in the workspace of the full-screen application. Although applications that lack mashup capabilities can be modified to include mashup functionality, the techniques of the present disclosure permit existing applications to be used within a mashup scenario such that predefined components within the application UI can be isolated, cut, or hidden without requiring any modification of the existing applications.

In certain implementations, a particular UI element of an application is selected for cutting or removal from the application UI. The UI element can be selected by a user at a particular position in the UI of the application according to the user's preference or based on the current layout of the application's UI. The application's runtime environment or a UI framework then renders only the portions of the application's UI control tree as determined by the UI element selected for cutting. The rendering of only certain parts of the control tree can be accomplished in the application UI framework itself or through an additional "UI cutter" layer on top of the application UI framework. The user can then use the area of the application in which previously rendered components are now hidden or no longer rendered by the UI framework to insert a different UI component, such as a mashup component, of another application or service. Alternatively, in some implementations, the user can cut and remove a UI element for use as a mashup component to be included in other mashup scenarios. Further, the entire application can be split into different pieces so that each UI component of the application is handled as an individual removable or mashable component.

One potential benefit of such techniques is that an application may be used in combination with mashable components from an external source to create a new service or a new presentation of existing services within the UI of the application, even if the application does not have existing mashup capabilities. Existing, or legacy, business applications, for example, may not inherently provide support for mashup scenarios. Still further, existing applications may require or be designed for full-screen use, making it difficult to use the full-screen applications as a mashup component within another page. Using modification-free cutting of components from the full-screen application UI, however, the existing full-screen application may be implemented as a mashup area or workspace for other mashable UI components. For example, a full-screen application may display a master table with a list of employees, and a second table may display a view of details associated with each employee listed in the master table. A user may want to use detailed information listed in the second table with data from other external mashup applications. Instead of re-accessing a back-end server or database for the detailed information associated with the employees while executing the external mashup applications, a user can continue to use the full-screen application, but can cut the second table and remove the master table from view using the techniques of the present disclosure. The user can then insert the external mashup applications into the full-screen application's workspace made available after cutting of the second table. Additionally, the user can employ a tagging mechanism as described in the present disclosure to connect the inserted mashup applications with the needed detailed employee information of the second table so that data flows are defined between the second table and the mashup applications. Alternatively, the user may save the second table as a mashup component after the second table is cut from the user interface of the full-screen application. The second table can then be used as a mashup component in other applications. Thus, the user is provided with a wide range of options and flexibility when the user requires mashup functionality but may be using an application that lacks mashup capabilities.

Further, instead of modifying the application to implement a mashable environment, the UI elements and components of an application can be removed, rearranged, or reformatted only at the rendering level of the application UI framework. Thus, the application can incorporate mashable components into the application's UI, while the underlying application remains unmodified to implement the mashup capabilities. One direct benefit of allowing existing applications to incorporate mashable elements without modifying the application is that the application can be upgraded as needed but still be used essentially as a mashable application. Another possible benefit of modification free UI cutting is to ensure that the underlying business logic of existing applications is not affected after cutting pieces of the application UI or incorporating a full-screen application into a mashup scenario. Still further, for the user, the process of removing pieces of the application UI is not bound to a particular programming skill, such as for example Hyper Text Markup Language (HTML) or JavaScript, and does not require specific technical skills of the user.

Turning to the illustrated example, FIG. 1 illustrates an example environment 100 for modification-free UI cutting of an application. The illustrated environment 100 includes or is communicably coupled with server 102 and one or more clients 135, at least some of which communicate across network 112. In general, environment 100 depicts an example configuration of a system capable of providing a mashup workspace using the UI of an existing application, regardless of whether the existing application has inherent mashup capabilities. The environment 100 also supports a system capable of injecting mashup components into the UI of the existing application or providing tagging capabilities for tagging UI elements in the application.

In general, server 102 is any server that stores one or more hosted applications 122, where at least a portion of the hosted applications 122 are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server, where the hosted applications 122 represent one or more web-based applications accessed and executed via network 112 by the clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications 144 associated with the clients 135 of environment 100 and responding to the received requests by processing said requests in the associated hosted application 122, and sending the appropriate response from the hosted application 122 back to the requesting client application 144. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, and one or more hosted applications 122. The interface 117 is used by the server 102 for communicating with other systems in a client-server or other distributed environment (including within environment 100) connected to the network 112 (e.g., client 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to intuitively cut pieces or elements of the UI from the workspace of hosted application 122 or to select a UI component 126 for insertion into the UI of hosted application 122. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and the clients 135), as well as with any other local or remote computer, such as additional clients, servers, or other devices communicably coupled to network 112 but not illustrated in FIG. 1. The network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 also executes the user interface (UI) framework software 128 for server 102. Similar to hosted application 122, the UI framework 128 may generally be any application, program, module, process, runtime engine, or other software that may execute, change, delete, generate, or otherwise manage information according to the present disclosure, particularly in order to implement modification free UI cutting of business applications. The UI framework 128 may be separate from hosted application 122, while in other instances, the UI framework 128 may be embedded within or part of a particular one or more of hosted applications. In some instances, hosted application 122 may be communicably coupled to the UI framework 128, allowing hosted application 122 to access and take advantage of the functionality provided by the UI framework 128. The functionality provided by the UI framework 128 can include providing UI support for development of web representations of business applications, for example.

As illustrated, the UI framework 128 includes a UI injection module 130, a tagging module 132, and a UI cutting module 134. These modules may be embedded within the UI framework 128 as shown in FIG. 1, or instead may be communicably coupled to the UI framework 128 within the server 102. In still further instances, any, all, or a combination of the modules may be located external to the server 102 and perform their relative functionality through communications and interactions facilitated by network 112. Each module may be an agent, daemon, object, service, plug-in, or other software capable of performing the respective module's functionality and operations. Additionally, each module may simply represent a portion of the UI framework 128 (and in some instances, the hosted application's 122) programming, such that the module itself is inseparable from or an integral part of the UI framework 128.

Turning to the first of the modules, the UI injection module 130 is used by the server 102, in connection with one or more of the hosted applications 122, to inject or insert a mashup component 126 into the UI of a hosted application 122 where the hosted application 122 does not necessarily have preexisting mashup capabilities. A mashup component 126 is an application or a module, subroutine, process, service, or other component of an application that can be combined with other similar components into a new service or arranged in a particular layout along with other components to present a customized arrangement of applications for convenient access to a user. The mashup component 126 can be visually represented as a UI element that is easily moved from one location to another within the GUI 160a. Further, mashup components can also be "mashable" in the sense that they can be linked with other components or with an underlying application for data flow. That is, input and output ports from one mashup component can be connected to input and output ports of another mashup component or application.

In some instances, the UI injection module 130 utilizes the existing personalization infrastructure of the hosted application 122 to inject or combine a mashup component 126 into the UI of the hosted application 122. The personalization infrastructure includes persistent personalization settings that store personalization data for the hosted application 122. Just as personalization data would typically be stored in the persistent personalization settings during normal execution of the hosted application 122, the data associated with the insertion of the mashup components 126 in the hosted application UI is also stored in the persistent personalization settings by the UI injection module 130. The persistent personalization settings allow personalization data to be stored for an application and for changes to the personalization data to remain in effect even after termination of the application. The personalization settings can also be used to generate controls for the mashup component 126 such as a text field or a UI link element. Thus, even when hosted application 122 requires use of the full screen of GUI 160a during runtime, the UI of the hosted application 122 may still be used as a backdrop for including mashup components 126 in the application UI. Further, UI injection of a mashup component 126 into an application using the personalization settings avoids binding the process to a particular programming interface such as Hyper Text Markup Language or JavaScript.

Specifically, the UI injection module 130 can merge an external mashup component 126 into the hosted application's UI by creating a UI container after receiving input from a user indicating the UI element or location in the application's UI that is to be used for receiving the mashup component 126. The parameters of the UI container are added to the UI control tree of the application, and the location of the UI container within the control tree and the mashup component 126 are stored in the persistent personalization settings of the application. Finally, the mashup component 126 is executed within the UI container as an embedded application or embedded component within the hosted application's UI. The injection of the mashup component 126 into the application UI results in the integration of a UI framework 130 standard component or application with the underlying hosted application 122. In other words, the mashup component 126 can be injected into the UI of the hosted application 122 using the personalization settings of the hosted application 122, without requiring a user to have knowledge of particular technical skills. Further, in some implementations, the injected mashup component 126 can be linked to services, modules, subroutines, or other components within hosted application 122 by connecting input or output ports between the mashup component 126 and any components within hosted application 122.

The second module is the tagging module 132 used by the server 102, in connection with one or more of the hosted applications 122, to apply tagging data to data objects used by a hosted application 122 that does not necessarily have pre-existing data tagging capabilities. The tags that are applied to data objects can be merely descriptive of the data object, or the tags can be additional data linking the data object to an application such as, for example, a mashup component 126. The tagging data applied to data objects help facilitate user-intuitive extension of the functionality of current applications that do not necessarily have tagging capabilities. In some instances, the tagging module 132 utilizes the existing personalization infrastructure of the hosted application 122 to apply tagging data to data objects used by hosted application 122. The tagging data is not stored for a UI element or a field of the UI element but for bound data objects underlying the UI element. The tagging data is stored in the same way as any other kind of personalization data for the application.

The UI cutting module 134 can present a visual representation of UI elements of a hosted application 122 in which pieces of the UI of hosted application 122 are "cut" or isolated from the UI in response to selection by a user, such as in a mashup scenario. Typically, hosted application 122 is rendered in GUI 160b based on a control tree that defines the UI of the entire hosted application 122. In some instances, the control tree defines the UI of a full-screen application. The UI cutting module 134 can receive a selection from a user of hosted application 122 indicating a particular UI element to be isolated or viewed exclusively in the UI of the application. The UI cutting module 134 then determines which portions of the control tree to render such that the undesired parts of the UI are removed from the user's view, leaving only the remaining UI elements to be rendered from the control tree. Although only the particular UI element is rendered in the application UI after the UI element is cut, the functionality of the remaining UI elements that are not rendered may, in some instances, still be performed in the background. In other words, the application's components may continue to function normally, and only the view of the application is changed. In some implementations, the control tree information associated with the UI elements that are to be rendered after certain UI elements are cut is stored in the personalization settings of the hosted application 122.

The illustrated environment of FIG. 1 also includes one or more clients 135. Each client 135 may be any computing device operable to connect to or communicate with at least the server 102 and/or via the network 112 using a wireline or wireless connection. Further, as illustrated by client 135a, each client 135 includes a processor 146, an interface 142, a graphical user interface (GUI) 160b, a client application 144, and a memory 150. In general, each client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of the clients 135 through the display, namely, the GUI 160b.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120, may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122. Further, memory 120 may store personalization settings data 124 used by hosted application 122 for customized cutting or injection of mashup components 126 into the hosted application's UI. Still further, memory 120 may include any other appropriate data, such as VPN applications, firmware logs and policies, HTML files, data classes or object interfaces, unillustrated software applications or sub-systems, firewall policies, a security or access log, print or other reporting files, as well as others.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user directly utilizing GUI 160a to cut UI elements from the application UI or to inject mashup components 126 to the application UI. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
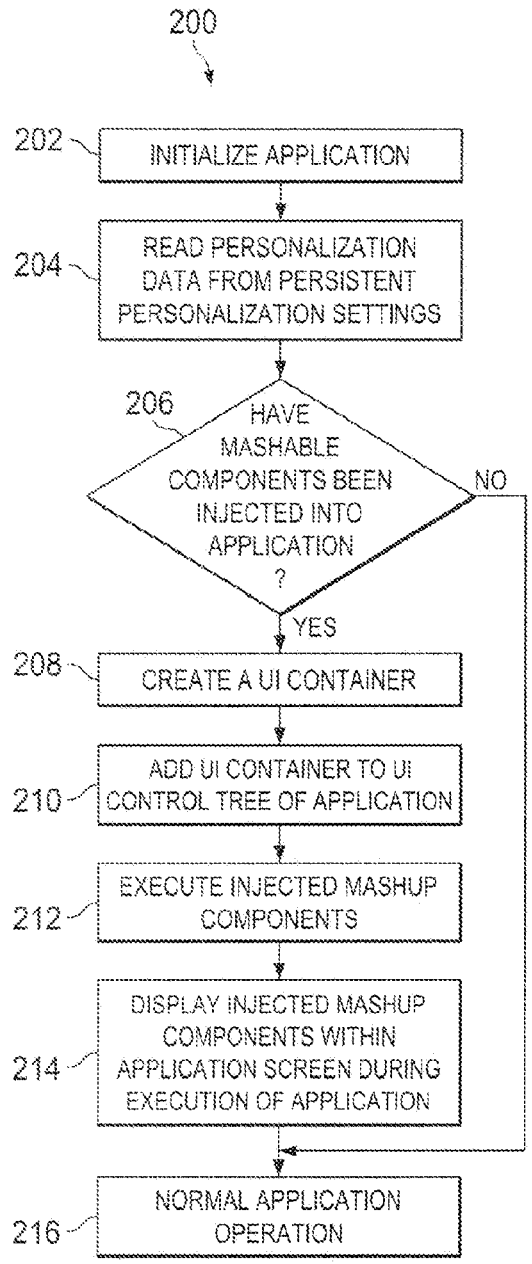
FIG. 2 is a flow chart of an example process of initializing an application with an injected UI component using an appropriate system, such as the system described in FIG. 1.

FIG. 2 is a flow chart illustrating the process of initializing an application implementing the modification-free injection methods of the present disclosure. The application 122 is started at 202. The application's runtime environment reads personalization data from the persistent personalization settings 124 for the application 122 at 204. The persistent personalization settings 124 are generally used by the application 122 for personalization of the application's 122 interface and settings for a particular user. In other words, the application 122 can load the personalization settings 124 for the user at runtime of the application 122 to generate the appropriate interface for the user of the application 122. In certain implementations, the application's existing personalization settings 124 infrastructure can also be used to implement a mashable area for insertion of mashable components 126 into the application's UI. Thus, if mashable components 126 have previously been "injected" into the application 122, the personalization settings 124 would include personalization data specific to the insertion of the mashable components 126. The application's runtime environment determines whether the personalization settings indicate any mashable components that have been "injected" into the application 122 at 206. If mashable components have not been injected into the application 122, then the application 122 is executed under normal operations at 216. If personalization data is stored in the personalization settings 124 in connection with a previous mashable component injection, the application runtime environment creates a UI container at 208 and adds the UI container to the UI control tree of the application 122 at 210. The UI control tree is the software code that describes the hierarchy of UI controls for the application 122. Here, the position of the UI container within the control tree is defined in the personalization data. Next, the UI container executes the injected mashable components 126 as part of the application 122 at 212. The application 122 is executed at 214, and the user can view the first screen of the application UI, which includes the injected mashable components 126. The application 122 returns to normal operations at 216.

Figure 3:
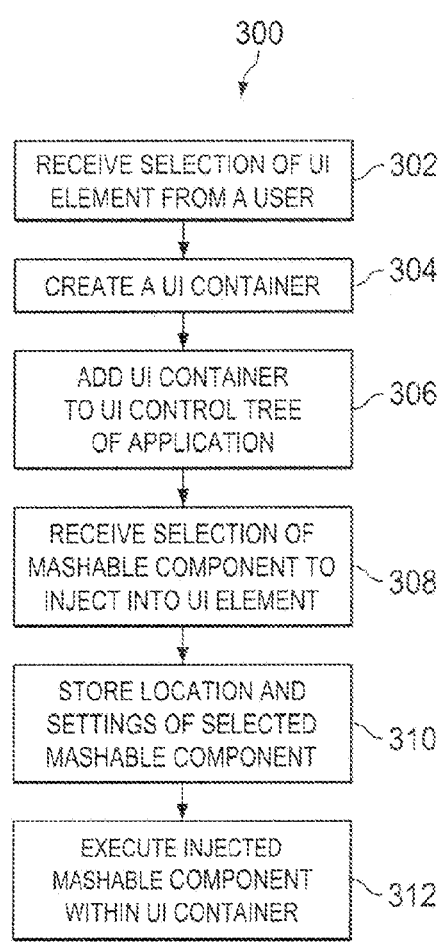
FIG. 3 is a flow chart of an example process of injecting a new UI component using an appropriate system, such as the system described in FIG. 1.

FIG. 3 is a flow chart illustrating the process of injecting a new mashable component 126 into an application's UI. First, a selection is received from a user for using a particular UI element of the application to contain a mashable component that is to be injected into the application UI at 302. The user may select a particular portion of the application UI to store or receive the mashable component that will be inserted into the application UI. The application runtime environment then creates a UI container at 304 and adds the UI container to a position in the UI control tree as defined by the location of the UI element selected by the user at 306. The position of the UI container in the UI control tree is stored in the persistent personalization settings for the application 122 as any other personalization data for that application 122. At 308, a user can select a mashable component to inject into the UI element. In certain implementations, the selection can be performed through a drag-and-drop technique implemented using a user interface device such as a mouse. After the user has indicated the UI element and location where the mashable component will run, the application runtime environment stores the location and settings of the selected mashable component in the persistent personalization settings at 310. Finally, the UI container executes the injected mashable component within the application at 312.

Figure 4A:
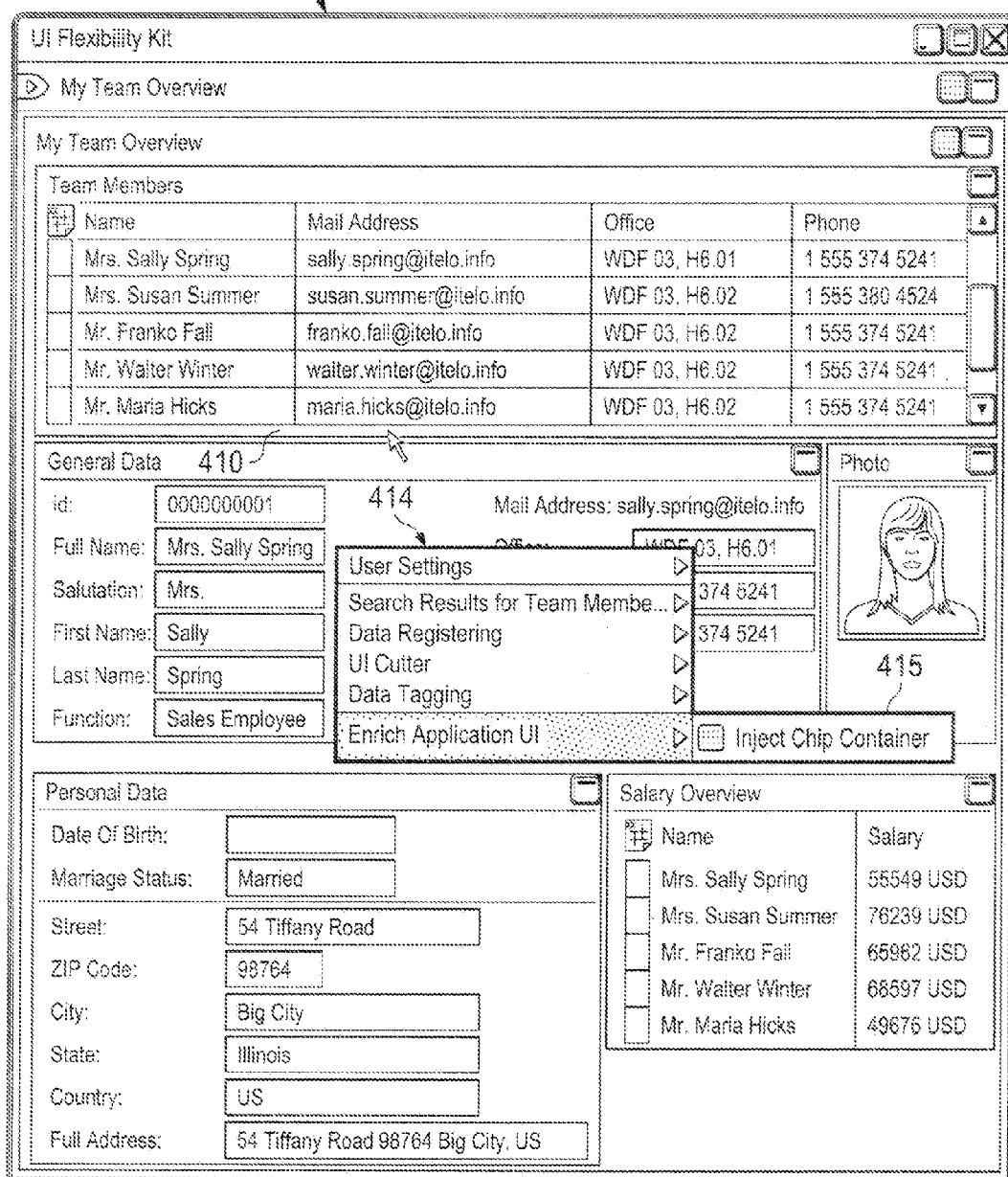

FIGS. 4A-4C depict an example process of injecting a new mashable component 126 into an application's UI from a user's perspective. First, as seen in FIG. 4A, a user selects a particular UI element 410 at which a mashable component 126 can be injected. In the illustrated example, the selected UI element 410 is a particular application component or a module of hosted application 122. In some implementations, any portion of the application UI can be used by UI injection module as a location to inject a mashable component 126. Further, the user's selection of the UI element 410 can be implemented using a variety of methods. In the illustrated example, a context menu 414 can be used to provide the user with a list of options, including a selection 415 to enrich the application UI by inserting a mashable component. Other methods can be used to allow the user to select a particular UI element 410 such as through, for example, a drag-and-drop mechanism or dialog boxes.

As depicted in FIG. 4B, after selection of the UI element 410, a user may be provided with a selection 430 of mashable components as possible components to be injected into the UI element 410 as selected by the user. Further, in some implementations, a wire frame 416 can be generated to represent the targeted location within the UI element 410 that is the future location of an injected mashable component 126. A user can select one of the mashable components 126 from a list 430 or drag a selected mashable component 126 into the wire frame 416 area. Finally, in FIG. 4C, after the UI element 410 and the mashable component 126 have been selected, the mashable component 126 is injected into UI element 410 and displayed in the previously selected region. Once the mashable component 126 has been injected into the UI element 410, it is stored as part of the personalization settings of the application 122. Accordingly, the injected mashable component 126 operates as a part of the application 126 because it is associated with the application's personalization settings.

In addition to injecting a mashable component 126 into an application UI, the UI framework 128 can also be configured to tag data in an application 122 even if the application does not support data tagging. As with injecting a mashable component 126 into the application, the UI framework 128 utilizes the persistent personalization settings of the application 122 to implement data tagging without modifying the application 122. At a high level, the UI framework 128 provides a mechanism for receiving and storing tagging data associated with a particular UI element in the application UI by saving the tagging data in connection with the data object represented in the UI element rather than in connection with the UI element. The tagging data is stored as personalization data in the persistent personalization settings, and all other UI elements which are bound to the data object can use the tagging data.

Figure 5:
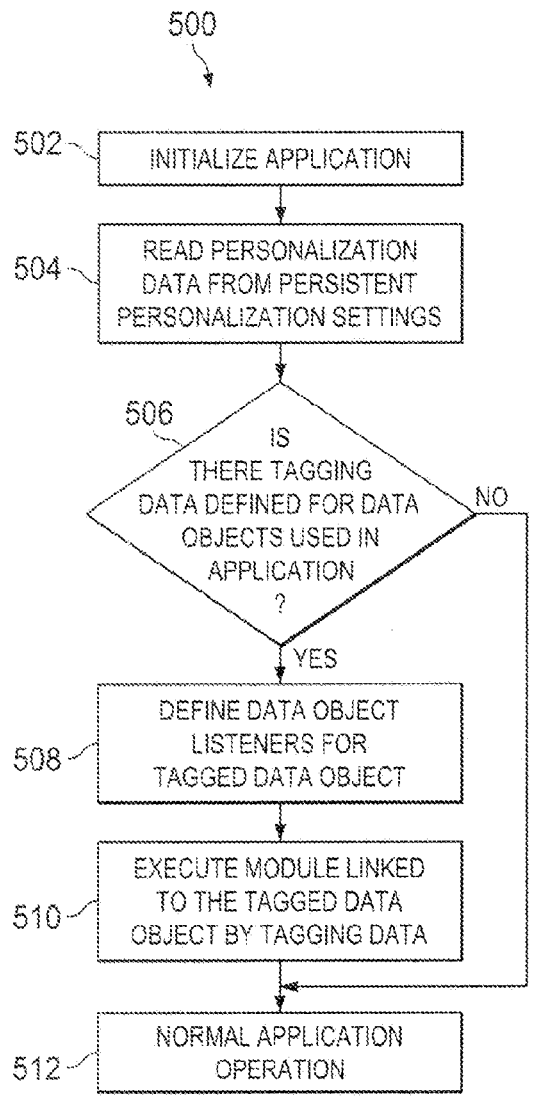
FIG. 5 is a flow chart of an example process of initializing an application with data objects that have been tagged using an appropriate system, such as the system described in FIG. 1.

FIG. 5 is a flow chart illustrating the initialization process 500 of an application that already contains data objects that have been tagged according to the process of the present disclosure. The application 122 is started at 502. The application's UI framework 128 reads personalization data from the persistent personalization settings 124 for the application 122 at 504. The persistent personalization settings 124 are generally used by the application 122 for personalization of the application's 122 interface and settings. In some implementations, the application 122 can load the personalization settings 124 for the user at runtime of the application 122 to generate the appropriate interface for the user of the application 122. The personalization settings 124 can also be used to store tagging data associated with data objects and information related to UI elements bound to the data objects. Thus, if a data object has previously been associated with tagging data, the personalization settings 124 would include personalization data specific to the data object and the tagging data associated with the data object.

At 506, the application's UI framework 128 determines whether the personalization settings indicate tagging data that has been defined for any data objects used by application 122. If tagging data has not been defined for data objects used in the application 122, then the application 122 is executed under normal operations at 512. If personalization data is stored in the personalization settings 124 in connection with data objects associated with tagging data, the application's UI framework 128 executes the tagging data by defining data object listeners for the tagged data objects at 508. A data object listener, also called an event listener or an event handler, is a particular kind of object or function in a computer program that is executed in response to a specific event. Specifically, in certain implementations, a data object listener is defined for a particular tagged data object such that when the tagged data object is modified or accessed by an application, such as hosted application 122, an appropriate response is executed in connection with the tagged data object. In one example, a data object can be tagged with data that links the data object to a module such as a search function. Selection of the data object results in execution of an online search for terms related to the data object. Based on the listener function defined for the data object, a different selection of a UI element bound to the data object can automatically result in a new search performed for terms related to any new data objects in the selected UI element. Returning to FIG. 5, after a data object listener has been defined for the tagged data object, a module that is linked to the data object based on the data object's tagging data can be executed at 510, and the application 122 continues under normal operation at 512.

Figure 6:
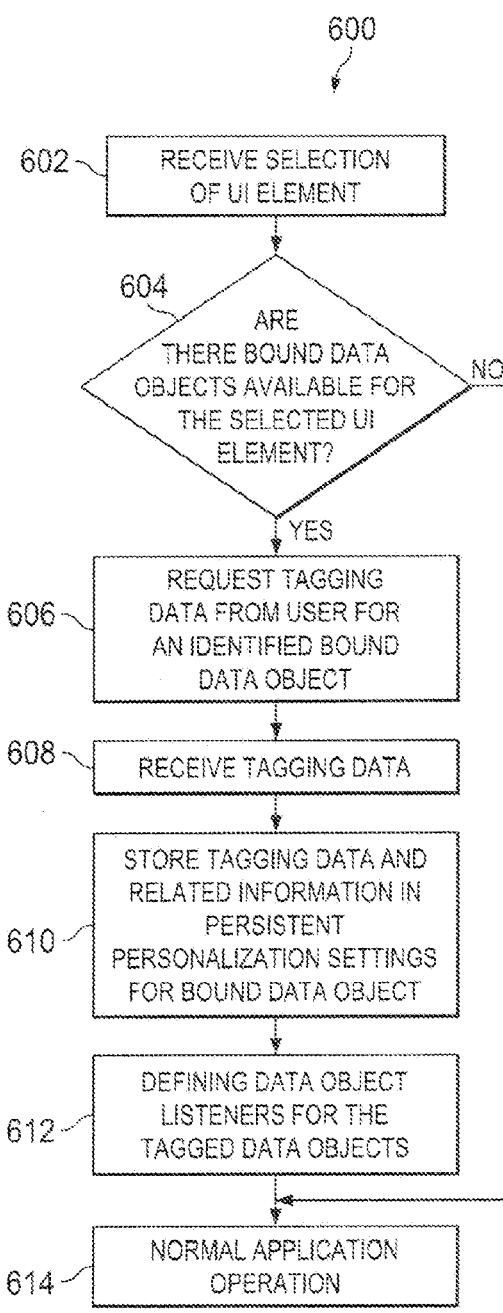
FIG. 6 is a flow chart illustrating the process of adding a new tag to a data object using an appropriate system, such as the system described in FIG. 1.

FIG. 6 is a flow chart illustrating the process 600 of adding a new tag to a data object. At 602, a user selects a UI element that is visible on the application UI for the purpose of adding a new tag to the UI element. The selection of the UI element can be done using various mechanisms. For example, a context menu can be used to provide a plurality of selections to the user, giving the user extended functionality while using the application 122 based on the selection of the particular UI element. After selection of a UI element, the application's UI framework 128 determines whether a bound data object is available for the selected UI element at 604. In some implementations, a data object may be referred to as being bound to a particular UI element when the data object is represented visually in a field contained in the UI element. Here, if the UI element is not bound to a data object, the UI framework 128 will not be able to store tagging data for a particular data object, and the application 122 continues under normal operations at 614. If the UI element contains a bound data object, the UI framework 128 requests tagging data from the user at 606 and receives the tagging data at 608. After receiving the tagging data, the tagging data and information relating to any associated UI elements are stored in the persistent personalization settings for the application 122 as any other personalization data for that application 122 at 510. The tagging data can be stored in the persistent personalization settings as a single attribute of a complex structure or even the whole structure. Further, the tagging data can be specified by a unique key such as the context path of the personalization data. Thus, because the tagging of data objects is implemented using the personalization settings of the application 122, tagging data can be given to data objects without modifying the application 122. Once the tagging data is stored in the personalization settings, the tagging data is applied to the particular bound data object, including defining a data object listener for the data object at 612. After the data object listeners are defined for the data object, the application 122 resumes normal operations at 614.

Figure 7:
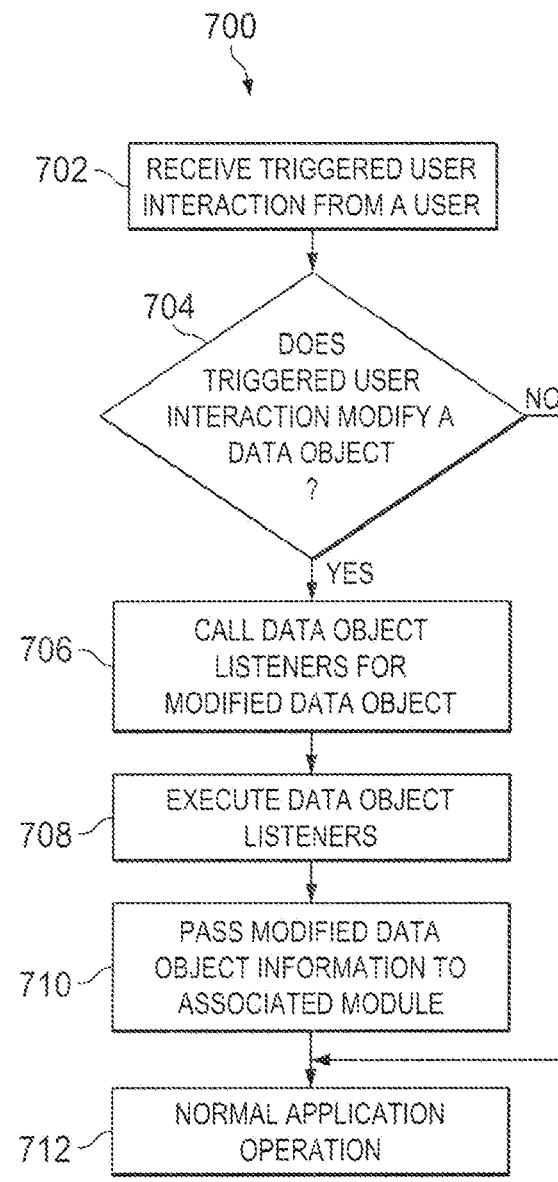
FIG. 7 is a flow chart illustrating the processing of tagged data using an appropriate system, such as the system described in FIG. 1.

FIG. 7 is a flow chart illustrating the processing 700 of tagged data. At 702, a user triggers a type of user interaction with a UI element within the application UI such as, for example, selecting the UI element with a user interface device or changing the selection in a table. The application's UI framework 128 determines if the triggered user interaction results in a change in value to the tagged data object associated with the UI element or a selection of the tagged data object at 704. If the triggered user interaction does not modify or select the data object, then the application 122 continues under normal operations at 712. In either case, if the tagged data object has either been modified or selected, a data object listener that was previously defined for the data object is called and executed at 706 and 708. In certain implementations, the data object listener passes along any changes to a tagged data object to associated applications or functions. For example, if the tagging data for a particular data object links the data object to an online search application and the data object is modified, the data object listener may update the search function using the new value of the data object. As another example, a user may select a first data object that has been tagged and linked to a search application. When the user selects a second data object that has been tagged and linked to the search application, the selection of the second data object automatically triggers the data object listener and updates the search function with the second data object. Accordingly, execution of the tagging is completed when the changes to the data object are passed to the module or application linked to the data object via tagging data at 710 and the application 122 returns to normal operations at 712.

Figure 8B:
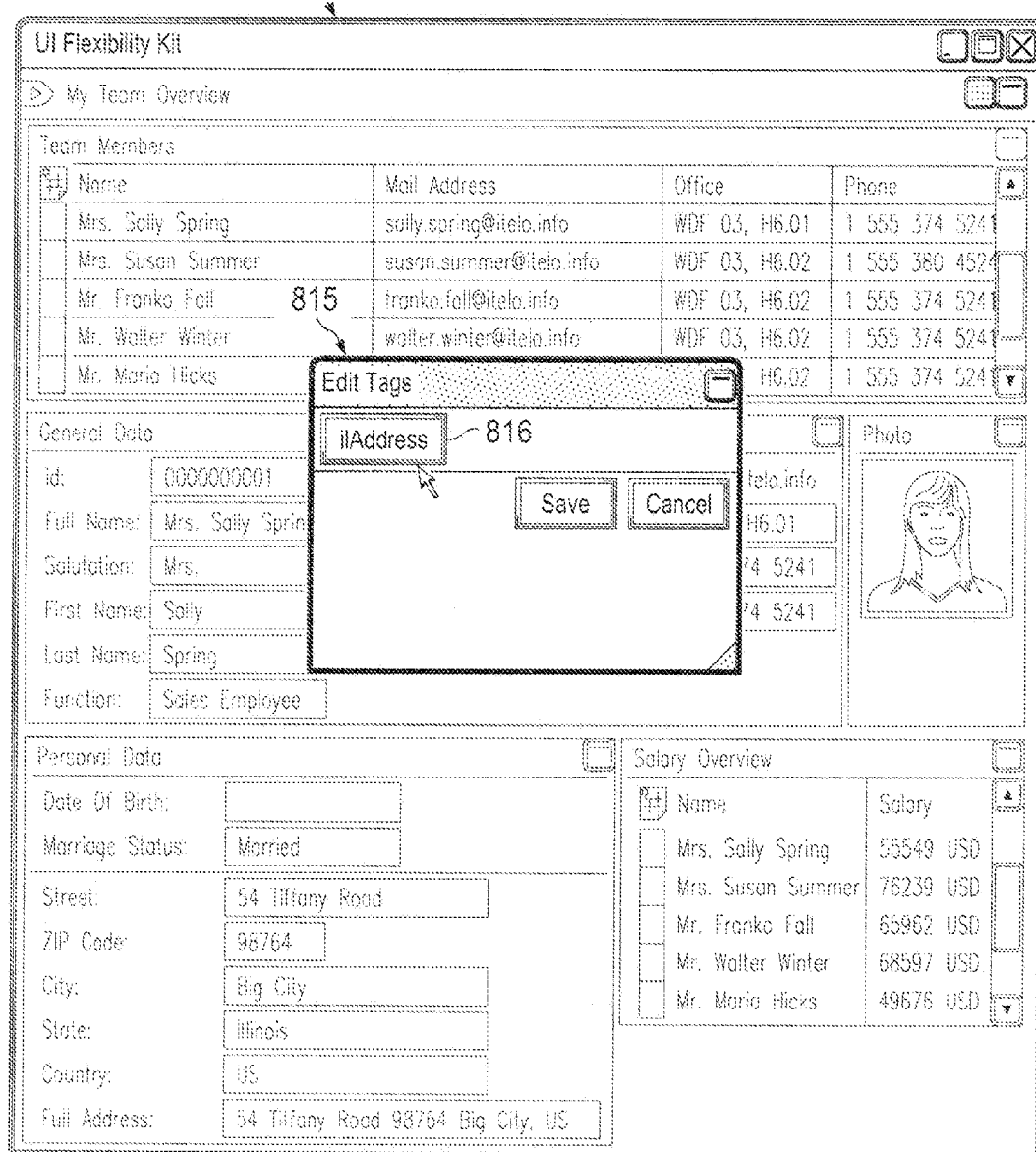
Figure 8C:
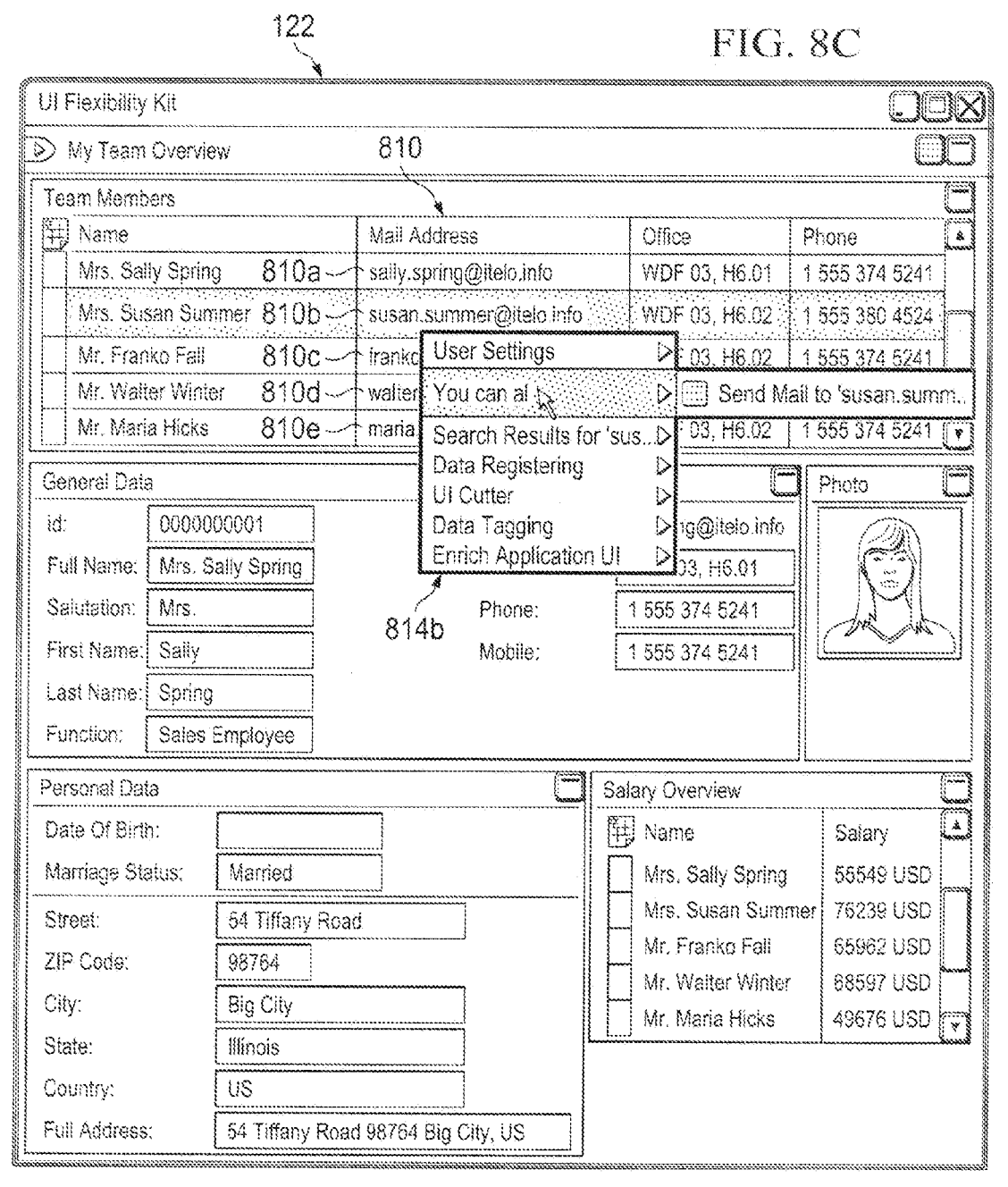

FIGS. 8A-8D depict an example process of enriching application elements through tagging of UI elements in an application UI. In the illustrated implementation, UI elements comprising team members' email addresses are tagged to associate the UI elements with execution of an email application, allowing the user to directly send emails to the email addresses without modifying or exiting the running application. First, as seen in FIG. 8A, a user selects a particular UI element 810*a* to be tagged. The UI element 810 in the illustrated example is a text field comprising email addresses of team members. The user's selection of the UI element can bring up a context menu 814*a* to provide the user with a list of options, including an option to enter tagging data for the selected UI element.

Figure 8D:
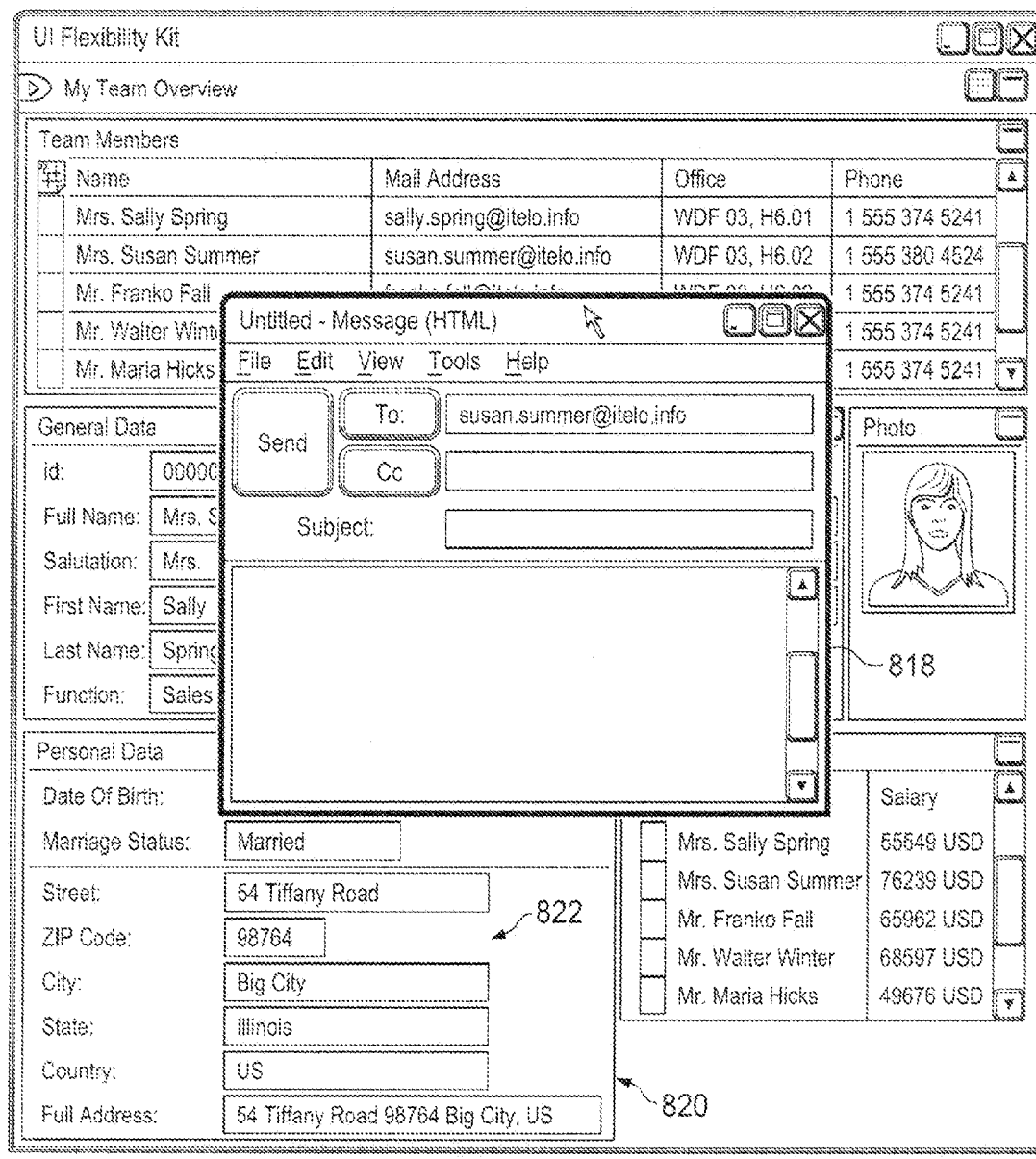

As depicted in FIG. 8B, after selection of the UI element 810*a*, a user is presented with a dialog box 815 to enter tagging data for the UI element 810. Here, the UI element 810*a* containing email addresses is tagged with an identifier 816 of an email application to be associated with the UI element 810*a*. The identifier 816 can be the name of an input port of the email application, and data objects that have been tagged with the identifier 816 can be wired to or associated with the email application. All underlying data objects associated with UI element 810 are then associated with the identifier 816, and the tagging data is stored in the personalization settings of the application 122. After the user has entered the tagging data for the UI element 810*a*, all UI elements 810 are associated with the email application. Thus, in FIG. 8C, the user selects another of the UI elements 810*b*, and a context menu 814*b* is presented that includes an option to execute an email application for the email address in UI element 810*b*. As illustrated in FIG. 8D, the email application is executed to allow the user to email the particular email address contained in UI element 810*b*. The present disclosure also contemplates other implementations of modification free tagging of UI elements. For example, in FIG. 8D, the user can tag the address 822 located under Personal Data in UI element 820 with an address mapping identifier. The address in UI element 820 can then be associated with an address mapping application so that the user can execute the address mapping application to view a map of the area surrounding the address 822.

Figure 9A:
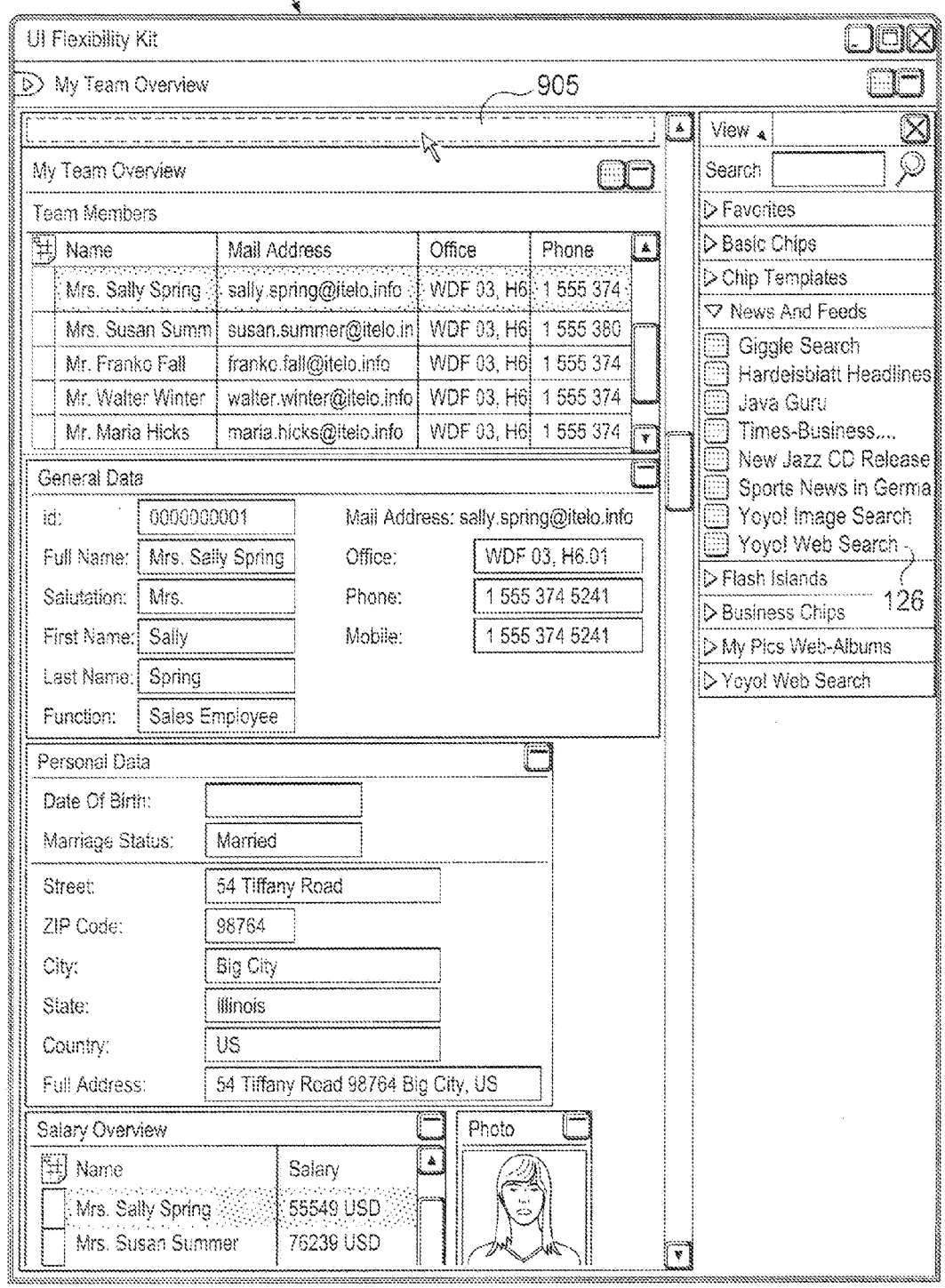
FIGS. 9A-D are example screenshots of an example UI injection and tagging process performed on a selected component of an application by an appropriate system, such as the system described in FIG. 1.
Figure 9B:
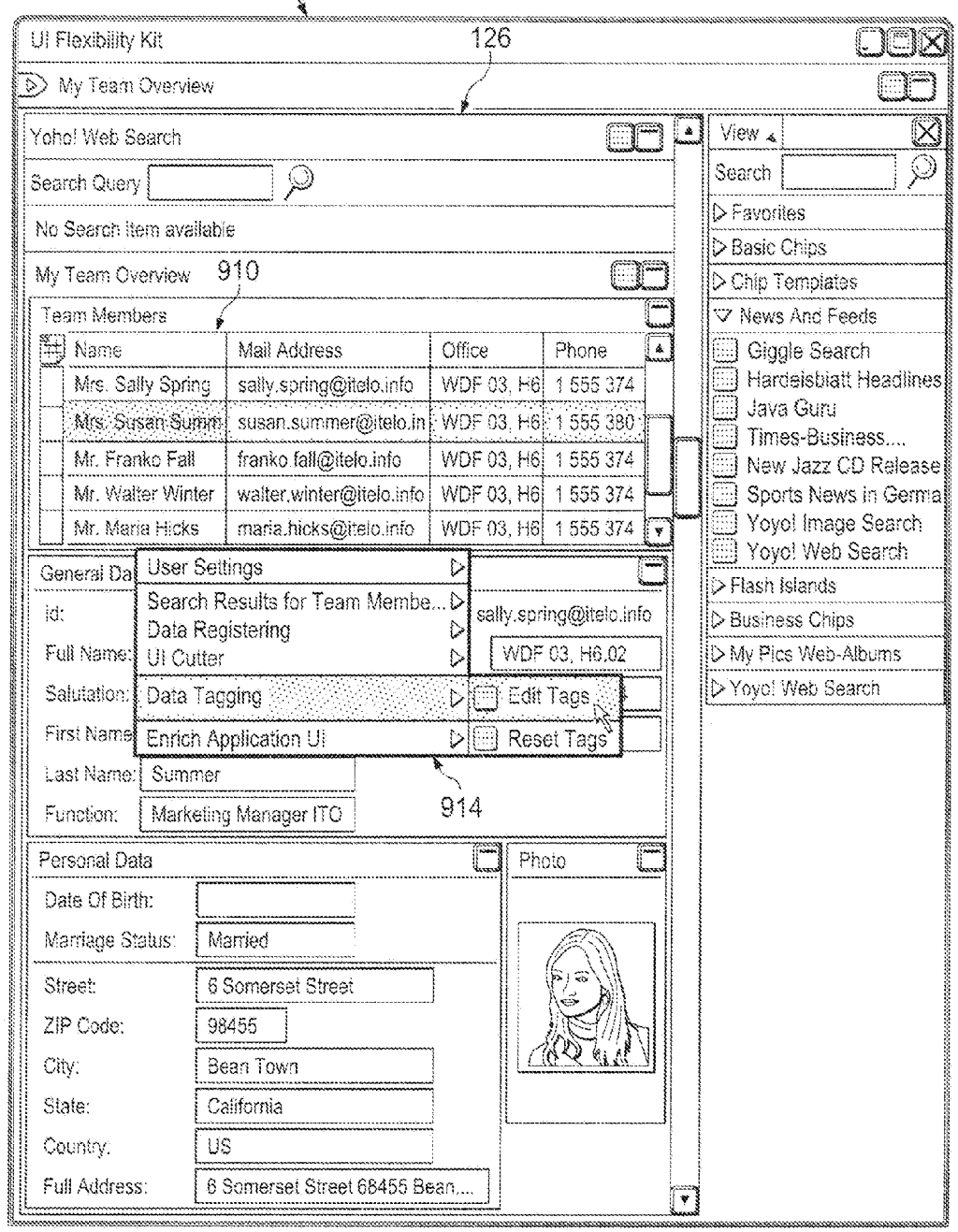
Figure 9C:
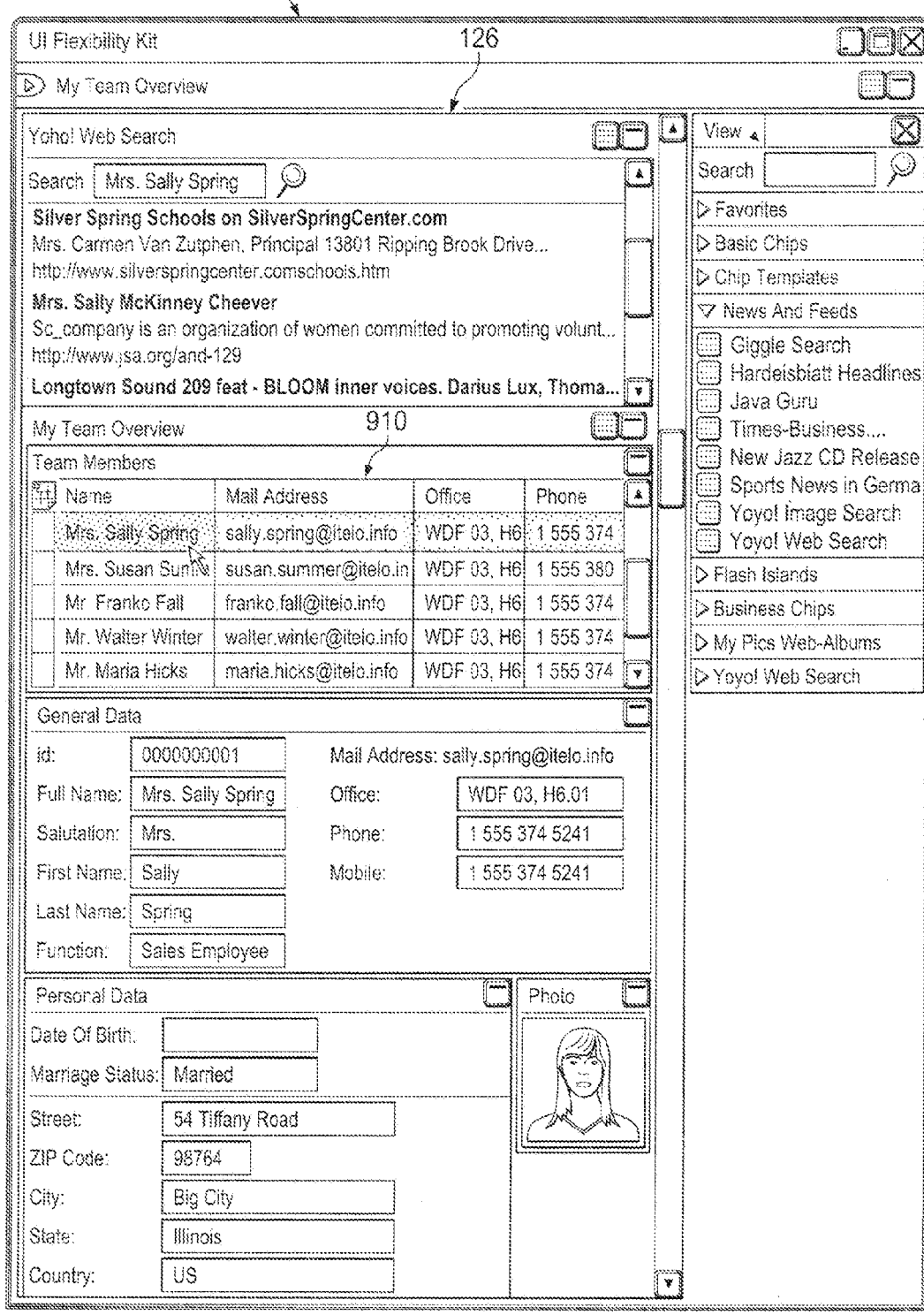
Figure 9D:
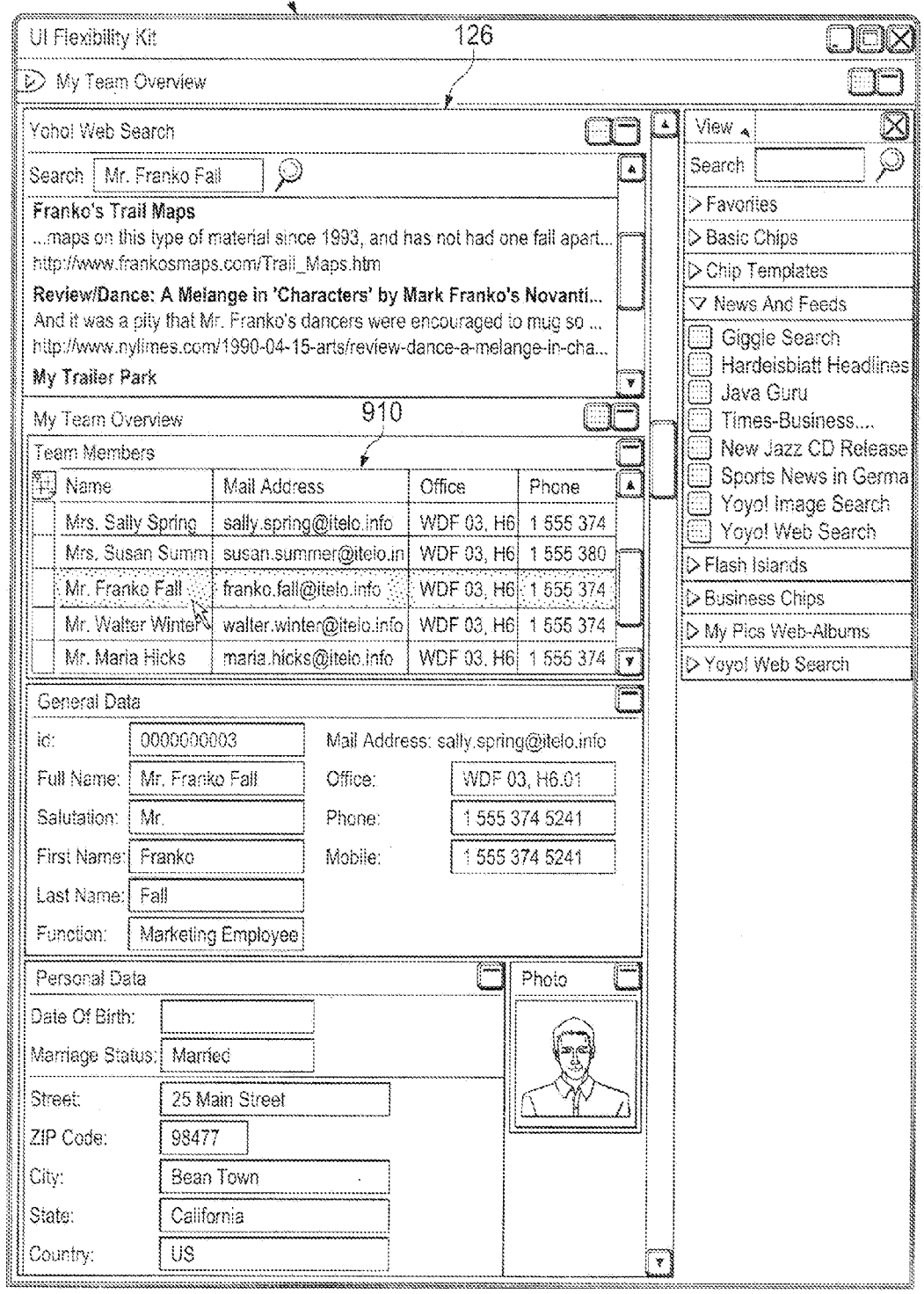

Still further, in some implementations, the modification free tagging of UI elements can be implemented in conjunction with the modification free UI injection process of the present disclosure as seen in FIGS. 9A-9D. Thus, as described above with respect to FIGS. 2, 3, and 4A-C, a mashable component 126 can be injected into a portion of the application UI. The injected mashable component 126 operates as a component within the application 126 and can then be tagged and wired to other components of the application 126 in accordance with the description of FIGS. 5, 6, 7, and 8A-8D so that the mashable component 126 can use data from the other components. As seen in FIG. 9A, a user can inject a mashable component 126 into a part 905 of the application UI using a context menu selection, a drag-and-drop mechanism, or other method. After the mashable component 126 has been injected into the application UI, the mashable component 126 is implemented as a part of the application 122 through the application's personalization settings. In the illustrated example, the mashable component 126 relates to an online search application. After the mashable component 126 has been injected into the application interface, the user can apply a tag to a UI element 910 in the application, such as the names of the team members, by selecting a tagging option from a context menu 914 as depicted in FIG. 9B. The tagging data can comprise an identifier that associates data objects contained in UI elements 910 with the online search application represented in the injected mashable component 126. Thus, each name contained in the UI elements 910 is wired to and associated with the online search application, and, as illustrated in FIGS. 9C and 9D, the user can execute the tag by selecting different UI elements 910. Further, different selections of different names in the UI elements 910 result in automatic updating of the search results displayed in the mashable component 126.

In certain implementations, the UI framework 128 can also be configured to allow a user to cut portions of the application UI even if the application is a full-screen application or if the application does not include mashup capabilities. At a high level, the UI framework 128 provides a mechanism for receiving a selection of a portion of the application UI to be cut from the application UI so that a user may view and access only the portion of the application UI that has been cut. Further, the additional space that has been created after cutting the application UI element can be used to inject external applications or mashup components. The UI framework 128 utilizes a control tree for rendering only the portions of the application UI desired by the user. The information associated with the portions of the control tree that are rendered are stored as personalization data in the persistent personalization settings.

Figure 10:
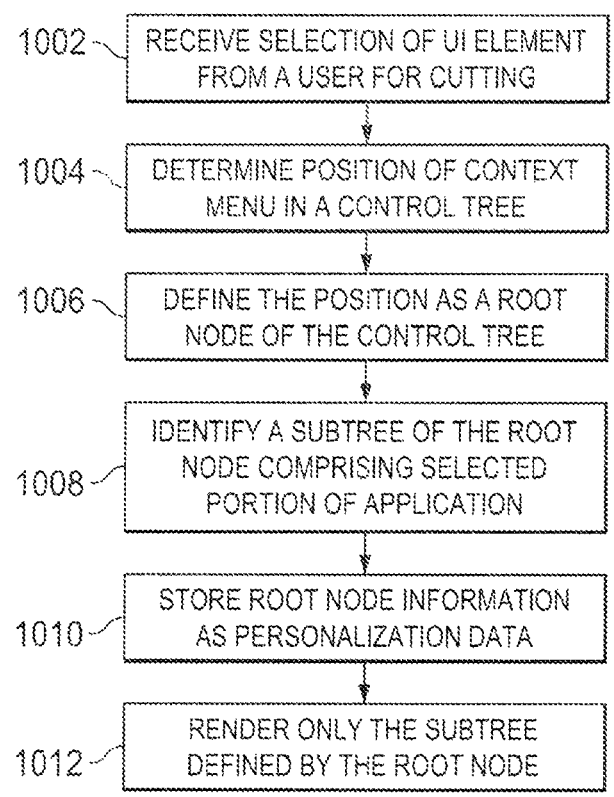
FIG. 10 is a flow chart illustrating the process of cutting a component of an application using an appropriate system, such as the system described in FIG. 1.

FIG. 10 is a flow chart illustrating the process 1000 of cutting a UI element from the UI of an application 122. First, at 1002, a selection is received from a user for using a particular UI element of the application 122 to be cut from the application UI. The cutting of elements from an application UI may comprise automatically hiding the unselected UI elements from view or visually removing the unselected UI elements from the workspace of a full-screen application 122. The cutting of the UI element may, for example, free up space in the UI of a full-screen application 122 for injection of external mashup components using a process such as that described in connection with FIG. 3. The UI element may also be cut and stored in a repository as a mashup component for injection into a different application.

In certain implementations, the selection of the UI element can be done using various mechanisms such as with a context menu, for example. A context menu can be a menu of various options available to a user of the application 122 that provides extended functionality associated with particular components or areas displayed in the application UI. A user may identify a particular UI element of the application UI for cutting by associating a context menu with the particular UI element and selecting a cutting option from the context menu. Based on the location of the UI element in the application UI as selected by the user, the UI framework 128 can determine the position of the context menu in a UI control tree of the application 122 at 1004. The UI control tree is the software code that describes the hierarchy of UI controls for the application and is used by the UI framework 128 to determine which UI elements of the application 122 to render. After the location of the context menu used to select the UI element in the control tree has been identified, the position of the context menu in the control tree is defined as a root node of the control tree at 1006. The location of the context menu in the control tree provides an indication of the location of the cut UI element in the workspace of the application 122, and the UI framework 128 can use the root node defined at 1006 to determine what elements of the application UI have been cut and, accordingly, what elements will be rendered in the application UI.

Next, at 1008, a subtree of the root node is identified. The subtree of the root node comprises the information that will be rendered in the application UI in place of the entire workspace normally rendered in the application UI. Thus, the UI framework 128 renders only the information defined in subtrees associated with the root node because the unselected UI elements are now defined in subtrees separate from the root node. The unselected UI elements now may be hidden from view and only the selected UI element is rendered. At 1010, the root node, or an identifier of the root node, is stored in the persistent personalization settings for the application 122 as any other personalization data for that application 122. Because the root node identification information is stored in the personalization data, UI elements of the application 122 can be removed or hidden without modifying the application 122. Finally, the UI framework 128 renders the selected UI elements and the subtree associated with the newly defined root node instead of the entire full-screen application UI. In other words, in follow up requests of the UI framework 128, the UI framework renders only the replacement subtree of the root node identified as the location of the UI element selected for cutting and not the other unselected UI elements. In this way, from the user's perspective, a UI element can be isolated from the workspace of the application 122, freeing up space in the workspace for rearranging other existing components of the application 122 or for injection of additional mashup applications. The cut UI element can also be stored as a mashup component for injection into other applications. The components of the application 122 that were not rendered, however, may still be executed in the background even if they are not visible to the user. In other words, all components initially displayed in the application UI may be processing in the background, but not all the components may be rendered by the UI framework 128, depending on the mashup scenario implemented by the user. Accordingly, the UI cutting module 134 can isolate or cut particular components of the application UI without modifying the application 122.

Figure 11A:
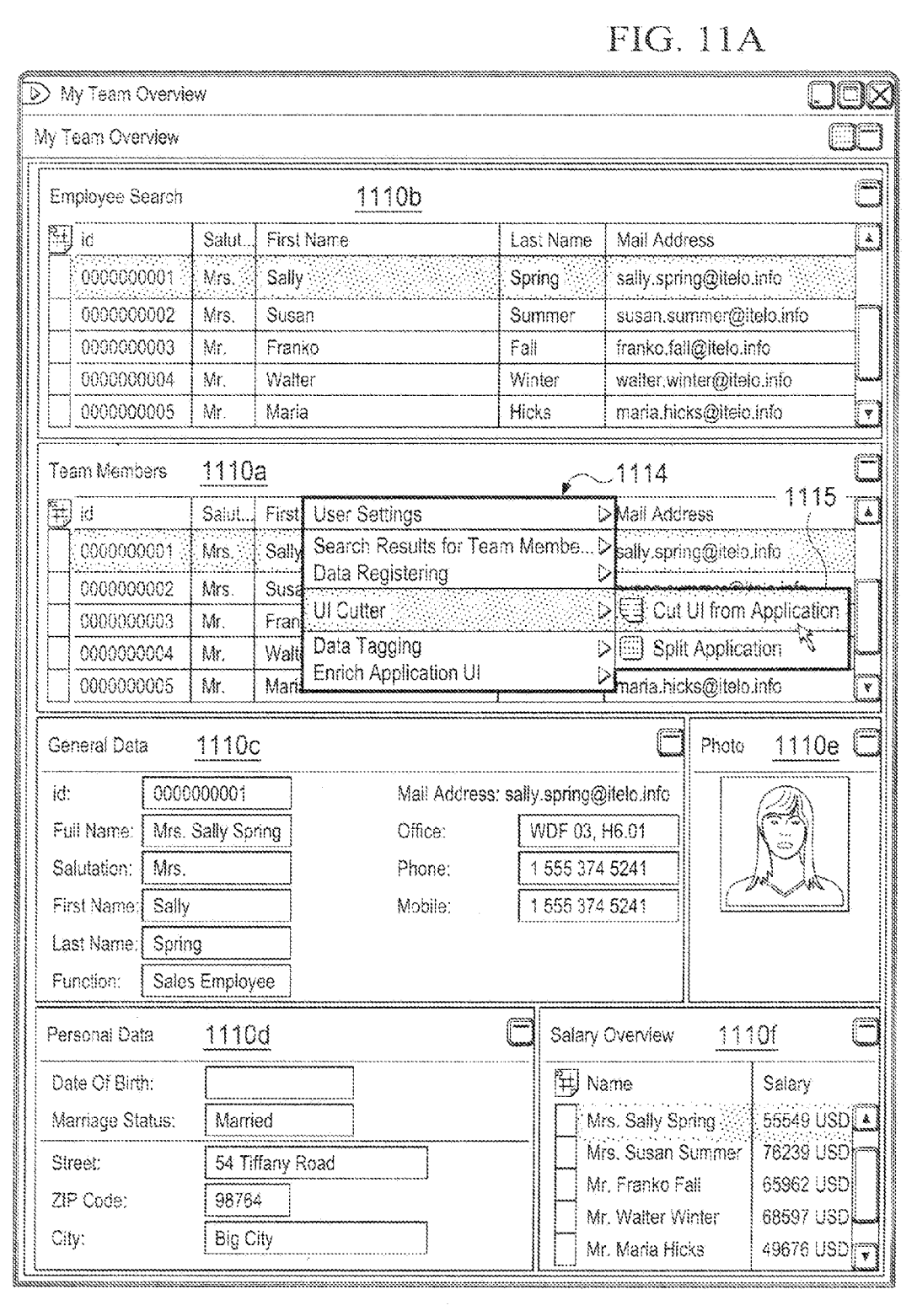
Figure 11B:
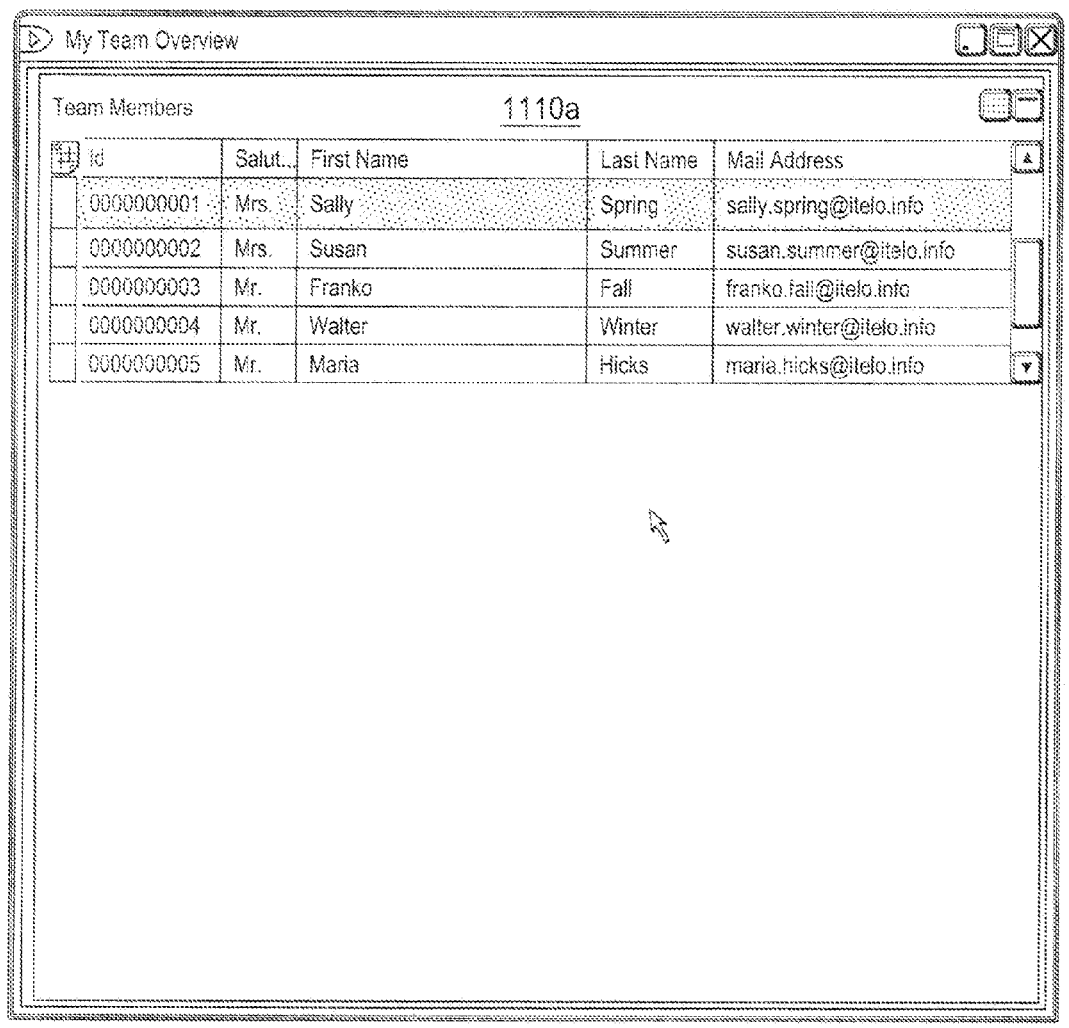

FIGS. 11A-11D depict an example process of cutting UI elements from the UI of an application 122. First, as seen in FIG. 11A, a user starts an application 122 with a user interface that occupies the entire screen and includes various components 1110a-f. The user selects a particular UI element 1110a to be cut from the full-screen application UI. In the illustrated example, the selected UI element 1110a is a particular application component or a module of hosted application 122. In some implementations, any portion of the application UI can be isolated or cut from the workspace of the application 122. In the illustrated example, the user's selection of the UI element 1110a for cutting is implemented using a context menu 1114, which provides the user with a list of options, including a selection 1115 to allow the user to cut a particular component 1110a from the application UI. Other methods, however, can be used to allow the user to select a particular UI element 1110a such as through, for example, a drag-and-drop mechanism or dialog boxes.

As depicted in FIG. 11B, after the user has selected the UI element 1110a to be cut from the application UI, the UI framework 128 renders only the UI element 1110a without rendering the other components 1110b, 1110c, 1110d, 1110e, 1110f of the application UI that were not selected by the user. Specifically, the UI framework 128 defines the location of the rendering data for UI element 1110a in the control tree for the application UI as a root node. Accordingly, the UI framework 128 will render only the subtree of the root node, which contains the rendering data for UI element 1110a, and will not render the parts of the control tree associated with unselected UI elements in the application UI.

Figure 11C:
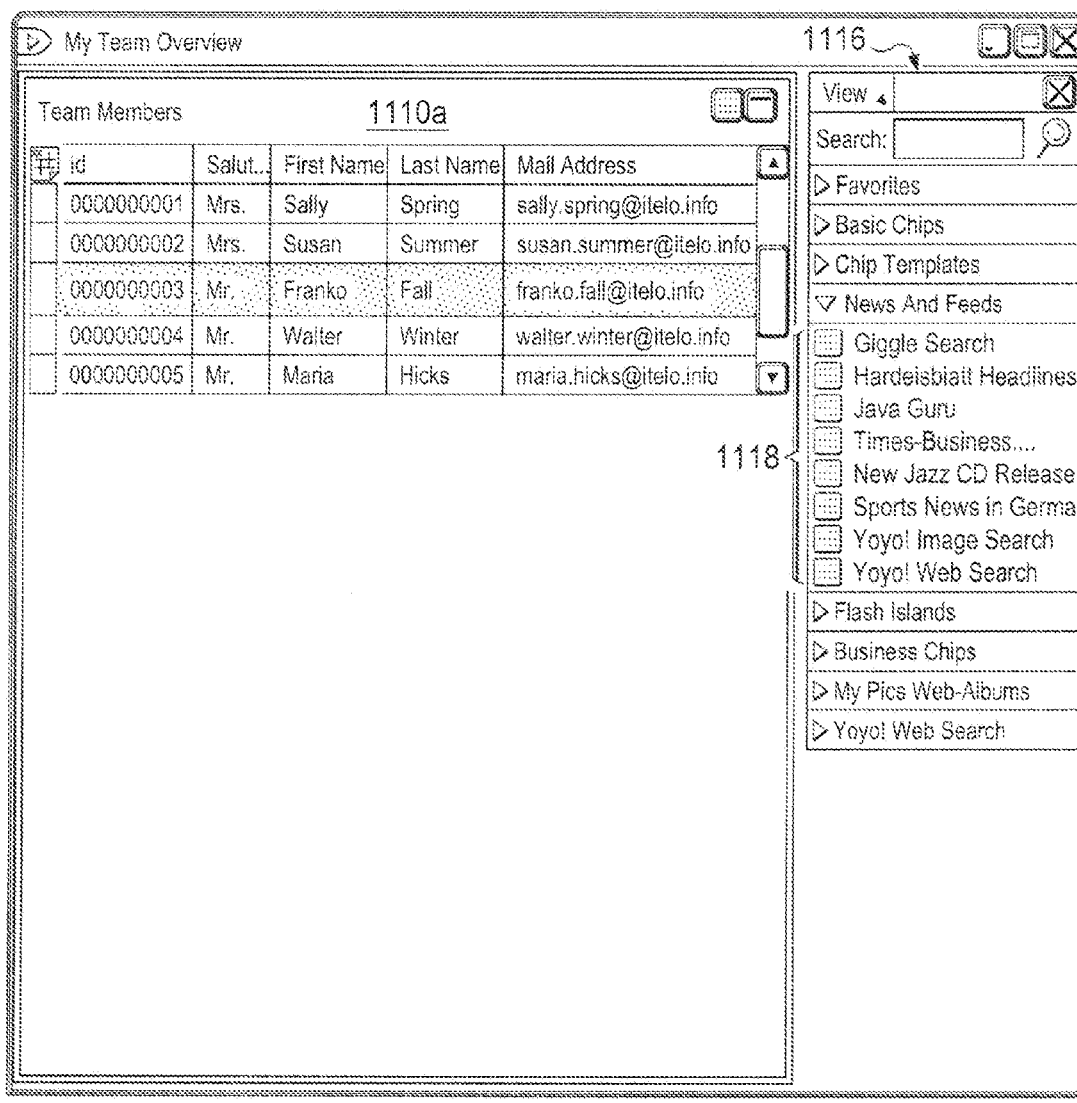
Figure 11D:
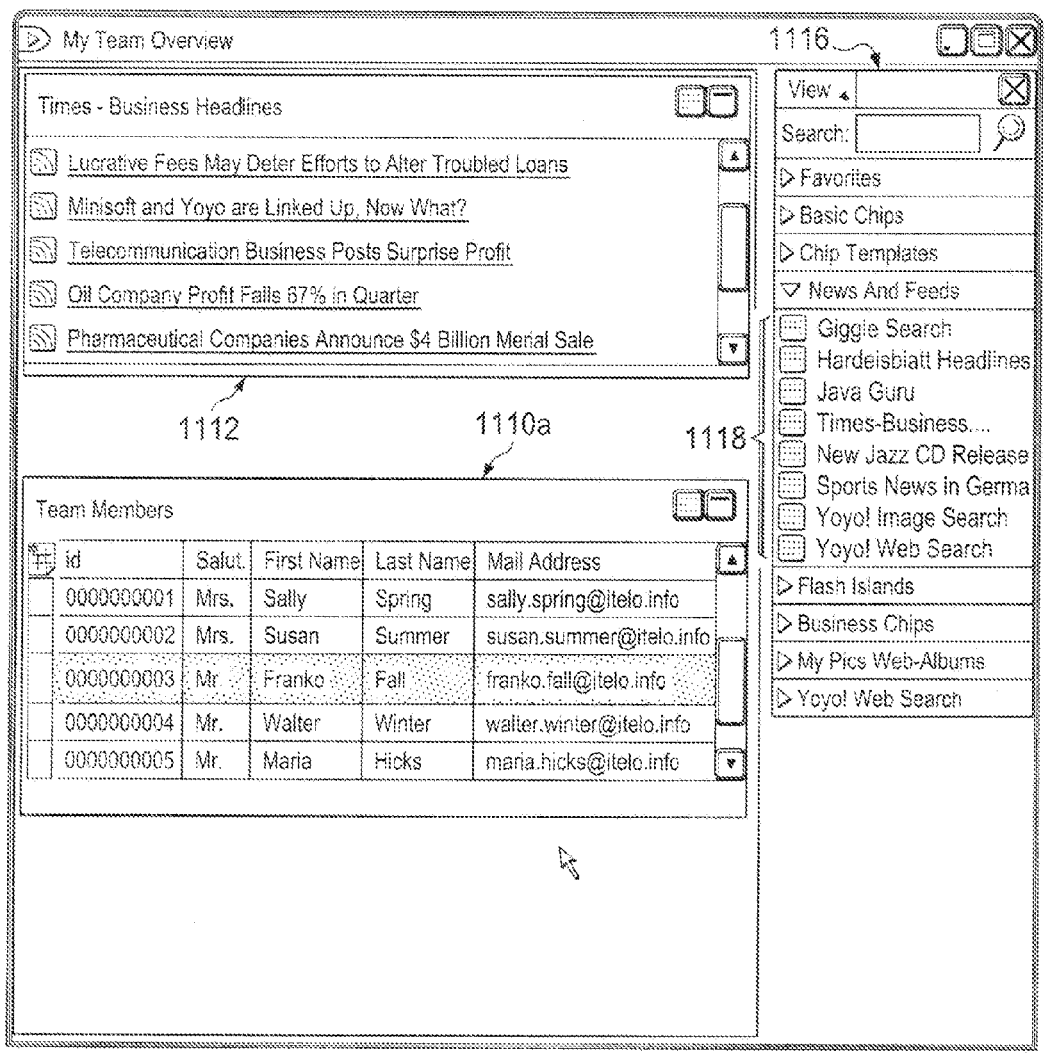

Once the UI element 1110a has been cut from the application UI, the workspace previously occupied by the unselected UI elements 1110b, 1110c, 1110d, 1110e, 1110f in application 122 is now displayed as empty workspace available for insertion of other applications or components such as external mashup components. For example, as shown in FIG. 11C, the user can open a side panel 1116 provided by the UI framework 128 that lists available mashup applications 1118 that the user can inject into the workspace area made available by the cutting of UI element 1110a. Next, as depicted in FIG. 11D, the user can select and insert a mashup component rendered as UI element 1112 into the application UI using a drag-and-drop mechanism or other method. As described above in connection with FIGS. 3 and 4A-4C, mashup components such as UI element 1112 can be injected into application 122 without modification of the application 122 using the UI injection module 130 of the present disclosure. Moreover, the tagging mechanism of the tagging module 132 can be used to enrich the UI elements in application 122 and define data flows and relationships between components. For example, the user can define data flows between cut application components and mashup components that have been injected into the application UI, depending on the availability of input and output ports associated with the cut application components.

Figure 12A:
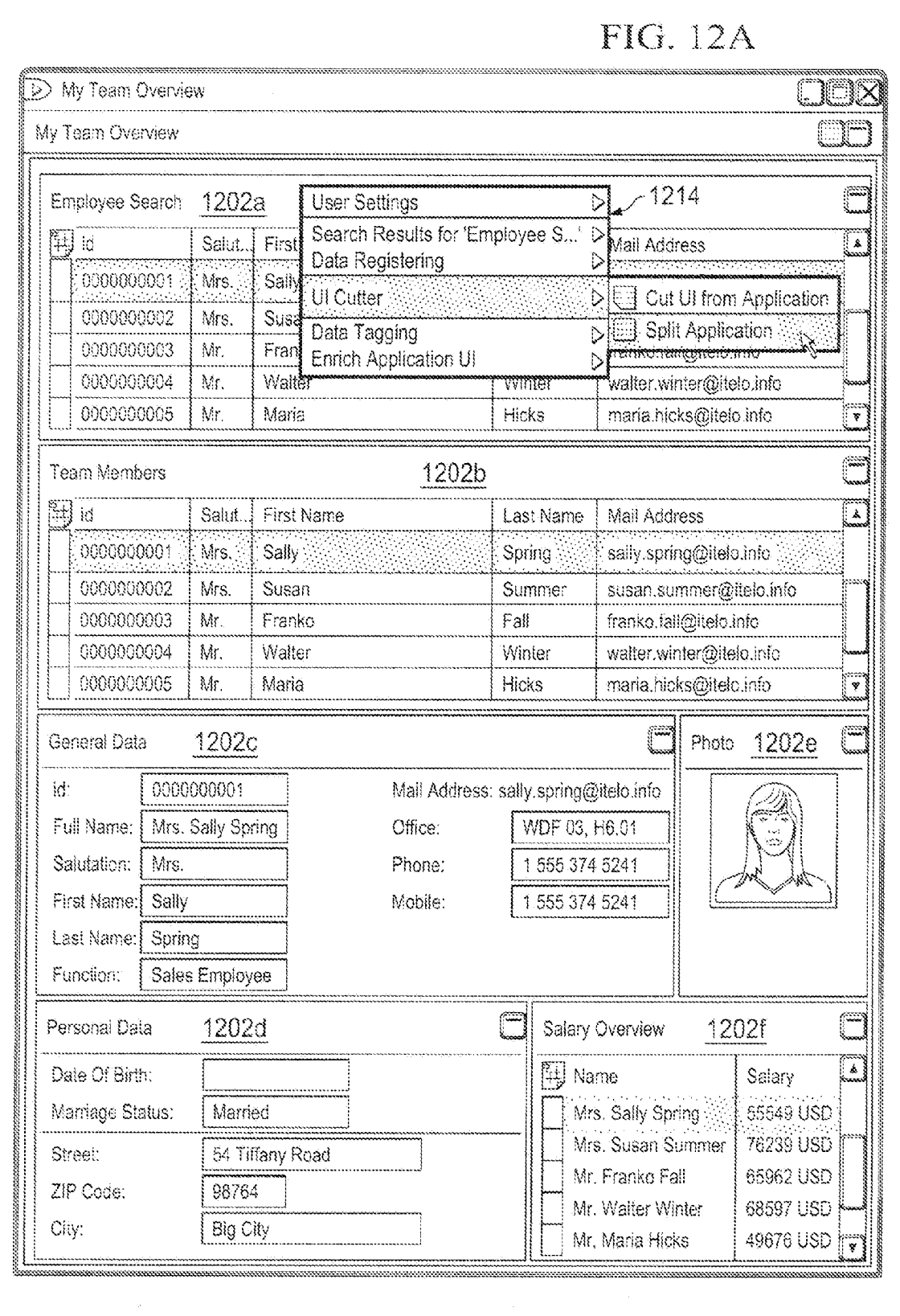
Figure 12B:

The UI cutting module 134 of the present disclosure can be used in other implementations to provide mashup functionality to an application even if the application lacks mashup capabilities. FIGS. 12A-12F depict an example process of cutting UI elements in an application UI into different components that can be rearranged or removed as mashable components. In particular, existing UI elements in a full-screen application 122 can be separated into different mashable components. For example, as shown in FIG. 12A, a user can initiate splitting of components in an application UI using a mechanism such as selecting a UI cutting option from a context menu 1214. Based on the user's selection, various components 1202a-f displayed in the application UI can each be rendered as individual components capable of being cut, removed, tagged, edited, connected to other components, or injected into external applications as a mashup component. In some implementations, as depicted in FIG. 12B, after the user has split the application UI using context menu 1214, the UI cutting module 134 can identify the location of the rendering information associated with each component 1202a-f in the control tree for the application 122. The UI cutting module 134 can then redefine the location of the components 1202a-f in the control tree in a particular order and store the redefined identification information for each of the components 1202a-f in the personalization settings of the application 122. Accordingly, the UI framework 128 may render the components 1202a-f in a particular arrangement and format based on the updated personalization settings and as depicted in FIG. 12B.

Figure 12C:

After the components have been separated, the UI cutting module 134 can dynamically change the order or arrangement of the separated components in accordance with actions received from a user of the application 122. For example, as illustrated in FIG. 12C, a user may select a particular component 1202d and, using a drag-and-drop action, may rearrange the order of the components such that component 1202d switches positions in the application UI with component 1202c. Here, the UI cutting module 134 utilizes the personalization settings of the application 122 to store information associated with the location of components in the control tree of the application 122 and may dynamically revise the information regarding the location of components within the control tree based on user actions. Thus, each component that has been cut can be used within the application workspace as a mashup component.

Figure 12D:
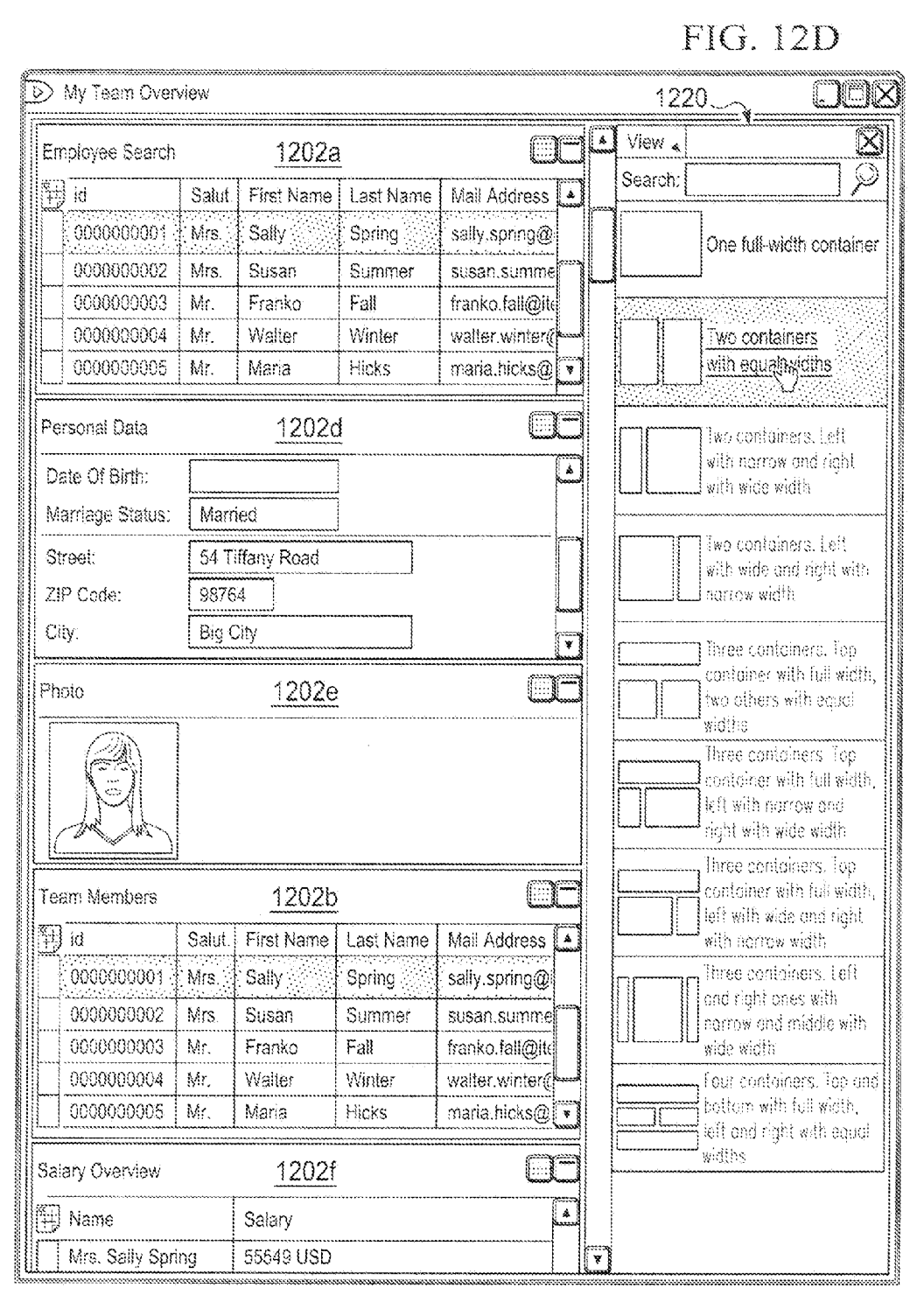
Figure 12E:
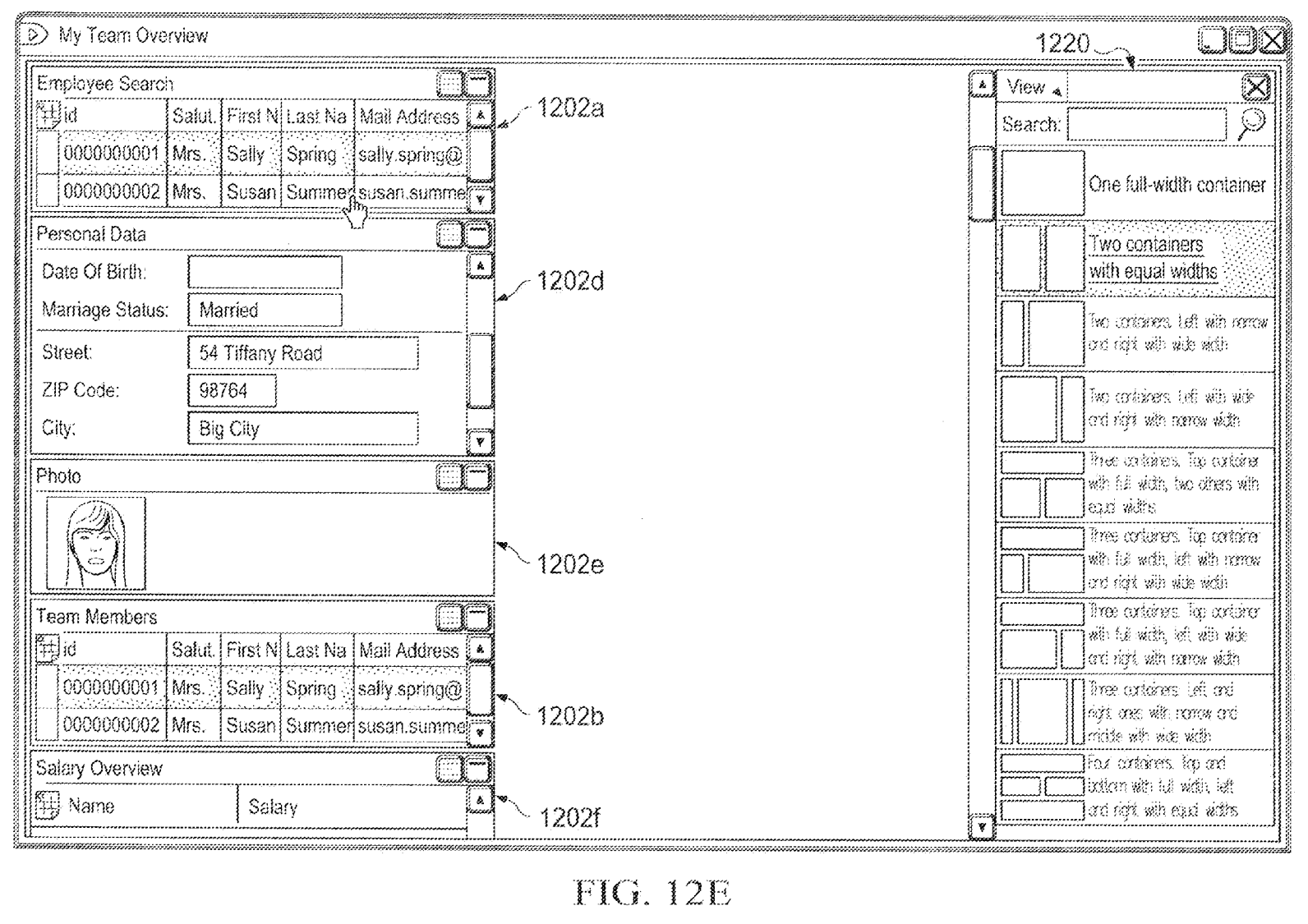
Figure 12F:
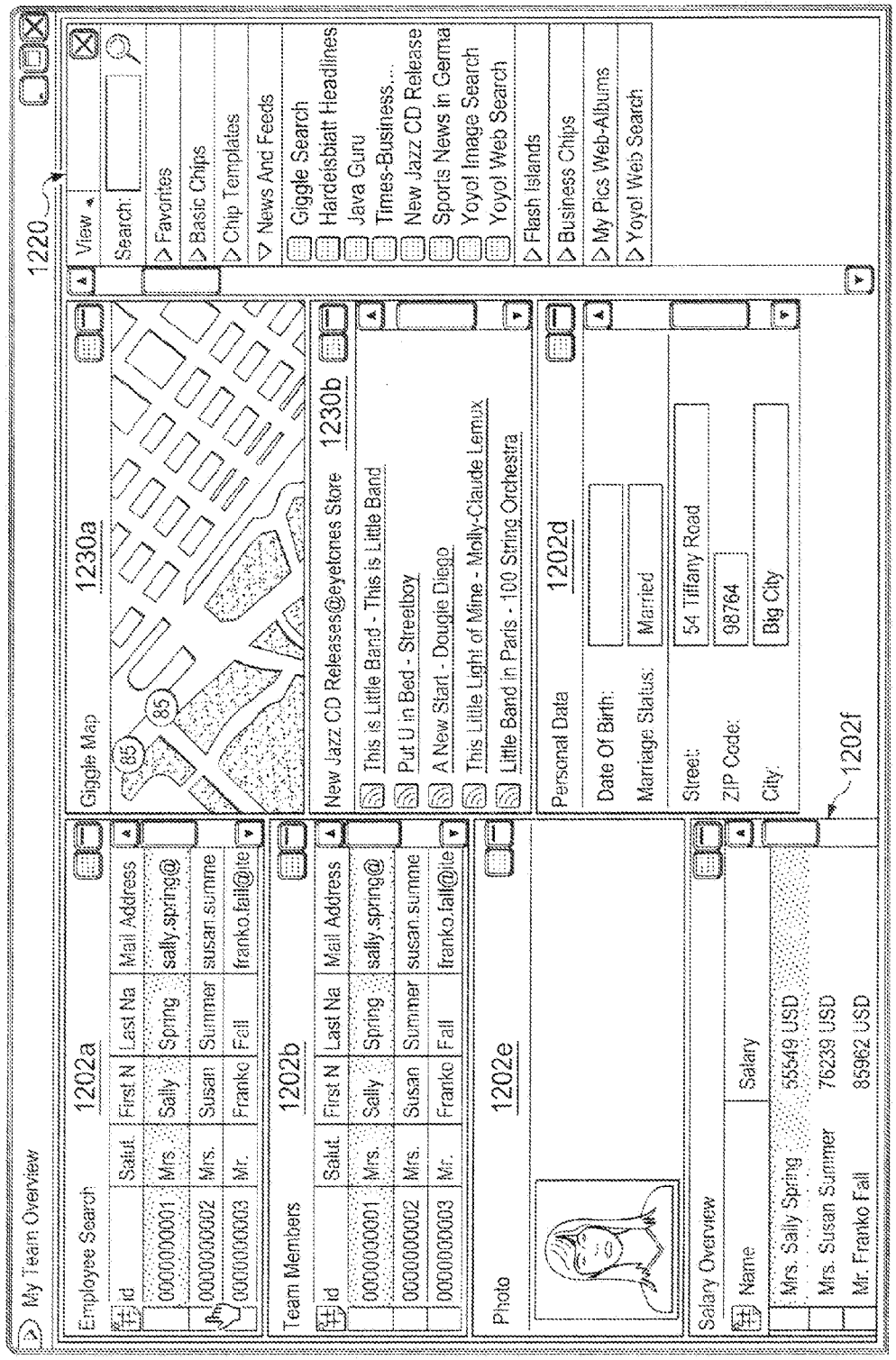

Further, additional features may be included by the UI framework 128 and UI cutting module 134 to implement a mashup environment for the application 122. For example, as seen in FIG. 12D, the UI framework 128 may provide a side panel 1220 that displays various formatting options of the workspace for the components 1202*a-f*. A user can select a particular format such as dividing the workspace of the application into two columns that function as containers for the components 1202*a-f*. The UI cutting module 134 can define boundaries for the components 1202*a-f* in the control tree for the application 122, and the UI framework 128 renders the components 1202*a-f* based on the updated information in the control tree. The updated rendering parameters for the control tree can be stored in the personalization settings of the application 122. In the illustrated example in FIG. 12E, the components 1202*a-f* are rendered such that the width of each component falls within the column container width in a two-column workspace format. The additional area generated by limiting components 1202*a-f* to one column in a two-column workspace can be used as a container to receive external mashup components 1230*a*, 1230*b* or to rearrange the cut components 1202*a-f*, as seen in FIG. 12F. In other words, the UI cutting module 134, the UI injection module 130, and the tagging module 132 can be used to generate a mashup environment after the application UI has been split into different components 1202*a-f*.

In some implementations, the split components 1202*a-f* can be further enriched through the tagging mechanism of tagging module 132. The user can also define data flows between cut application components 1202*a-f* and mashup components 1230*a*, 1230*b* that have been injected into the application UI, depending on the availability of input and output ports associated with the cut application components 1202*a-f*. In the illustrated example in FIG. 12F, component 1202*d* displays personal data of a selected team member and includes the address of the team member. The team member's address can be tagged by the user via tagging module 132 to associate the address displayed in component 1202*d* with execution of an address finder application displayed in component 1230*a*. Thus, a user's selection of the team member automatically executes a search for the address of the team member in the mashup application 1230*a* and displays the search results accordingly. Different selections of different team members listed in component 1202*b* result in automatic updating of the search results displayed in mashup application 1230*a*. Accordingly, the user of application 122 and UI framework 128 can generate a mashup environment using the UI injection, tagging, and cutting modules 130, 132, 134 of the present disclosure even if the application 122 is a full-screen application or lacks inherent mashup capabilities.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, example method 600 describes the linking of tagging data from a data object to a particular application so that the application can be executed using the data object. In certain implementations, the particular application that is linked to the data object can be a mashable component injected into the hosted application 122 using the modification free UI injection techniques of the present disclosure.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for causing one or more processors to cut a mashup component in a user interface of an application, the method comprising the following steps performed by the one or more processors:
   identify a user interface of an application, the user interface presented by rendering a user interface control tree associated with the user interface;
   identify a particular portion of the user interface of the application to be cut from the user interface, the portion representing at least one function of the application and a non-identified portion of the user interface representing at least one disparate function of the application;
   determine a position of the particular portion of the user interface in the user interface control tree of the application;
   define the determined position as a root node of a subtree associated with the identified particular portion of the user interface;
   store an identification of the root node in personalization settings of the application; and
   re-render the user interface control tree by rendering the subtree that is associated with the root node and the at least one function.

2. The method of claim 1, wherein identifying a particular portion of the user interface comprises receiving a selection of the particular portion from a user of the application.

3. The method of claim 1, wherein the user interface elements associated with the root node and the at least one function are rendered based on rendering data defined in the subtree of the root node.

4. The method of claim 1, wherein only user interface elements defined in one or more subtrees of the root node are rendered.

5. The method of claim 1, wherein the at least one disparate function associated with the non-identified portion of the user interface is executed without rendering user interface elements associated with the non-identified portion.

6. The method of claim 1, wherein the particular portion of the user interface comprises a user interface element representing a module of the application.

7. The method of claim 1, wherein the personalization settings include attributes comprising at least one of persistence.

8. The method of claim 1, wherein a user interface of the application includes a plurality of modules and the selection of a particular portion of the user interface of the application comprises a selection of one of the plurality of modules.

9. The method of claim 8, wherein rendering the user interface elements associated with the root node comprises rendering only the selection of one of the plurality of modules.

10. The method of claim 1, further comprising injecting a mashup component into the user interface of the application.

11. A computer program product encoded on a non-transitory tangible storage medium, the product comprising computer readable instructions for causing one or more processors to perform operations comprising:
    identify a user interface of an application, the user interface presented by rendering a user interface control tree associated with the user interface;
    identify a particular portion of the user interface of an application to be cut from the user interface, the portion representing at least one function of the application and a non-identified portion of the user interface representing at least one disparate function of the application;
    determine a position of the particular portion of the user interface in the user interface control tree of the application;
    define the determined position as a root node of a subtree associated with the identified articular portion of the user interface;
    store an identification of the root node in personalization settings of the application; and
    re-render the user interface control tree by rendering the subtree that is associated with the root node and the at least one function.

12. The computer program product of claim 11, wherein the user interface elements associated with the root node and the at least one function are rendered based on rendering data defined in the subtree of the root node.

13. The computer program product of claim 11, wherein only user interface elements defined in one or more subtrees of the root node are rendered.

14. The computer program product of claim 11, wherein the particular portion of the user interface comprises a user interface element representing a module of the application.

15. The computer program product of claim 11, wherein a user interface of the application includes a plurality of modules and identifying a particular portion of the user interface of the application comprises identifying one of the plurality of modules.

16. The computer program product of claim 15, wherein re-rendering the user interface control tree comprises re-rendering only the one of the plurality of modules without re-rendering user interface elements associated with non-identified modules of the plurality of modules.

17. The computer program product of claim 11, further comprising injecting a mashup component into the user interface of the application.

18. A system, comprising:
    memory operable to store information associated with splitting portions of a user interface of an application into mashable components; and
    one or more processors operable to:
        identify a user interface of an application, the user interface including multiple portions, the user interface presented by rendering a user interface control tree associated with the user interface;
        receive a request for splitting a portion of the user interface of the application into a mashable component;
        identify a discrete module in the user interface of the application for rendering as the mashable component;
        determine a particular position of the identified discrete module in the user interface control tree of the application;
        define the particular position of the discrete module as a root node of a subtree of the user interface control tree, the subtree associated with the identified discrete module in the user interface;
        store identification information for the root node associated with the identified discrete module in personalization settings of the application; and
        re-render the user interface control tree by rendering the subtree that is associated with the identified discrete module.

19. The system of claim 18, the processors further operable to:
    receive a request to move the identified discrete module to a new location in the user interface of the application;
    identify a position of the new location in the user interface control tree of the application;
    define the position of the new location as a node associated with the identified discrete modules in the user interface control tree of the application;
    store identification information for the node in personalization settings of the application; and
    render the one of the plurality of discrete modules based on rendering data for the node in the personalization settings of the application.

* * * * *